(12) United States Patent
Goyen

(10) Patent No.: US 9,311,326 B2
(45) Date of Patent: Apr. 12, 2016

(54) VIRTUAL FILE SYSTEM FOR AUTOMATED DATA REPLICATION AND REVIEW

(71) Applicant: Alterante, Inc., Menlo Park, CA (US)

(72) Inventor: Alejandro Goyen, Menlo Park, CA (US)

(73) Assignee: Alterante, Inc., Menlo Park, CA (US)

( * ) Notice: Subject to any disclaimer, the term of this patent is extended or adjusted under 35 U.S.C. 154(b) by 126 days.

(21) Appl. No.: 13/861,715

(22) Filed: Apr. 12, 2013

(65) Prior Publication Data

US 2014/0310241 A1    Oct. 16, 2014

(51) Int. Cl.
*G06F 17/30* (2006.01)

(52) U.S. Cl.
CPC .... *G06F 17/30174* (2013.01); *G06F 17/30233* (2013.01); *G06F 17/30575* (2013.01)

(58) Field of Classification Search
CPC ...................... G06F 17/30067; G06F 17/30575
See application file for complete search history.

(56) References Cited

U.S. PATENT DOCUMENTS

| | | | |
|---|---|---|---|
| 2002/0059245 A1* | 5/2002 | Zakharov .......... | G06F 17/30144 |
| 2006/0089954 A1* | 4/2006 | Anschutz ...................... | 707/202 |
| 2007/0276836 A1* | 11/2007 | Chatterjee et al. .............. | 707/10 |
| 2009/0248887 A1* | 10/2009 | Craft et al. .................... | 709/231 |
| 2009/0271412 A1* | 10/2009 | Lacapra et al. ................. | 707/10 |
| 2009/0300604 A1* | 12/2009 | Barringer ...................... | 717/178 |
| 2013/0218854 A1* | 8/2013 | Mungi .......................... | 707/697 |
| 2013/0304706 A1* | 11/2013 | MacInnis .......... | G06F 17/30194 |
| | | | 707/658 |

* cited by examiner

*Primary Examiner* — Mohammad S Rostami

(74) *Attorney, Agent, or Firm* — Perkins Coie LLP

(57) ABSTRACT

Various of the disclosed embodiments relate to systems and methods for reviewing, maintaining, and replicating data across a plurality of devices. For example, in some embodiments the system may replicate data across a plurality of internal and external storage devices connected to various computer systems in a home network. The user can review and direct replication via an interface in certain embodiments. In some embodiments, the user may use an email system to control and/or monitor the replication.

18 Claims, 30 Drawing Sheets

800a

| Key ID 801a | Metadata 1 801b | Metadata 2 801c | Metadata 3 801d | Metadata 4 801e | ... | Metadata N 801f |
|---|---|---|---|---|---|---|
| 802a d131dd02c5e 6eec4 | Vegas | C:/User/ Desktop | | | ○ ○ ○ | |
| 802b 41bed109c9e aeec2 | Private | Vegas | C:/User/ Desktop/ Pictures | /etc/storage/ backup | ○ ○ ○ | |
| 802c 55ad340609f 4b302 | Europe | /etc/storage/ backup | | | ○ ○ ○ | |
| 802d e99f33420f5 77ee8 | Bob | Paris | Europe | Public | ○ ○ ○ | |

| Metadata 803a | Key ID 1 803b | Key ID 2 803c | ... | Key ID N 803d |
|---|---|---|---|---|
| 804a Vegas | d131dd02c5e 6eec4 | 41bed109c9e aeec2 | ○ ○ ○ | |
| 804b Private | 41bed109c9e aeec2 | | ○ ○ ○ | |
| 804c Paris | e99f33420f5 77ee8 | | ○ ○ ○ | |
| 804d Europe | 55ad340609f 4b302 | E99f33420f5 77ee8 | ○ ○ ○ | |

*FIG. 8B*

| | | | | | | |
|---|---|---|---|---|---|---|
| UUID | IP Address | IP Port | Backup? | Free Space(GB) | Configs | Sync? | LastBat | LastSeq |
| 07320 6ad-2a26-6376-2231-e5039887 | 192.168.1.105 | 80 | no | 286.11 | Config Client2 Client3 Client4 Server | no | 38533 | 47 |
| 132432ab2-ee214-3a52-3122-beeb5feca565 | 192.168.1.101 | 8081 | yes | 11.20 | Config Client2 Client3 Client4 Server | no | 38506 | 47 |
| a7e106ad-2a26-6aaa-2c31-ea039211 | 0 | 0 | no | 0 | | | | |
| 51831773-9ef0-40c2-9631-6b5fe94565ee | 192.168.1.115 | 8080 | yes | 38.96 | Config Client2 Client3 Client4 Server | no | 38506 | 47 |

Mail configuration (rtserver/www-mailer.properties)          2900

```
pop3host=pop.gmail.com      // name of pop3 server
smtphost=smtp.gmail.com     // name of stmp server
log=logs/logger.txt         // path to save log
pop3delay=300000            // how often to ping the pop3 server (in milliseconds)
pop3port=995                // port of pop3 server
pop3user=username           // username mail account
pop3pw=password             // password mail account
smtpport=587                // port of stmp server
```

Web server configuration (rtserver/www.server.properties)

```
workers=5                   // number of worker threads
port=8080                   // port to listen for incoming clients
incoming=incoming           // directory where to store files recieved via POST
log=logs/rtserver.log       // path to save log
timeout=501                 // web server timeout (in milliseconds)
root=C:/www                 // root directory for web server
password=alterante          // password for requests
backupnode=yes              // indicate whether this client is a backup node
```

Backup configuration (scrubber/www-rtbackup.properties)

```
root=../cass/backups/                    //location where to store backup orders
timeout=10000
log=./rtbackup.log                       //path to save log
uuidpath=c:/alt2/scrubber/data/.uuid     //location of uuid file
mode=server                              //backup mode (client or server)
localpath=c:/temp/backup/list-local//client - where to store local backup orders
backuppath=c:/temp/backup/               //client - where to store backups
syncpath=c:/temp/sync/                   //client - where to store synchronized files
sleep_client=3000                        //client - wait time between batches
scrubcount=500                           //client - number of scans before a scrub
delay_file=100                           //client - number of files scan before pause
delay_time=2000                          //client - time to wait during scan pause
md5count=10                              //client - #of fast scans before deep scan
sleep_server_short=10000                 //server - wait time between backup order generation
sleep_server_long=86400000               //server - wait time when sequence changes
newseq=false                             //server - whether to update sequence
```

*FIG. 29*

VIRTUAL FILE SYSTEM FOR AUTOMATED DATA REPLICATION AND REVIEW

FIELD

Various of the disclosed embodiments relate to systems and methods for automatically or manually classifying, reviewing, maintaining, and replicating data across a plurality of devices.

BACKGROUND

The data generated and stored by the average user has grown dramatically following the digital revolution. The amount of digital files created by consumers and businesses is growing at double-digit annual rates. This information tsunami has created new challenges in data management, not only in terms of time and effort spent organizing, classifying, and discovering digital assets, but also in protecting data from accidental loss and managing security access control. Users may store critical financial information on the same storage device as family photos and work-related assets. The accessibility of various mobile devices, such as the iPhone®, has also made the generation of digital data more frequent among even inexperienced computer users. Social networking services have also spurred users to generate, share, and store a variety of different files.

Unfortunately, this plethora of data is not always organized in a manner conducive to safe and efficient management. Users may store their data in disparate locations where the data is not easily accessible, or centralize their data storage at a single location when the data would be more safely segregated among a plurality of devices. Often when a device fails, or a user loses access to a storage unit, they are without remedy. As a precaution, users must often adopt onerous personal backup habits, or create personalized scripting tools, to ensure that their data can be preserved. Since individual operating systems and hardware configurations may or may not lend themselves to the user's ad hoc solution, users must often turn to a third-party solution, such as a dedicated storage drive.

With the increasing ubiquity of data storage, however, the use of a single storage device for data replication appears increasingly inefficient. The typical home or office network may contain dozens of different computing devices, each possessing a myriad of different storage systems and capabilities. Ideally, a user could take advantage of this untapped resource to replicate and store their data across a distributed collection of storage devices.

Taking advantage of these disparate devices' resources is not easy. The topology of modern networks and the diversity of operating systems and hardware standards generally renders distributed replication unfeasible. Each computer device on a home or office network may have intermittent availability and may join and leave the network at unpredictable times, e.g. as a mobile phone is taken to work, as a laptop is brought home from school, as a Universal Serial Bus (USB) storage device is removed from a computer, etc. The devices may have a plurality of different partitions, with each partition servicing a different file system type. Confronted with these obstacles, users have often relied on a single external drive for their storage backup, and left the distributed resources of their multiple devices on their networks untapped.

Accordingly, there exists a need for a system capable of providing file replication and management across a plurality of devices in a dynamic network environment.

SUMMARY

Certain embodiments contemplate a computer system comprising: a display; a processor; and a memory comprising instructions, the instructions, in conjunction with the processor, configured to: receive a checksum associated with a file from a separate device; and receive a plurality of metadata associated with the file from the separate device.

In some embodiments, the instructions, in conjunction with the processor, are further configured to: receive a copy of the file from the separate device. In some embodiments, the instructions, in conjunction with the processor, are further configured to: display a Graphical User Interface (GUI) to a user. In some embodiments, the computer system further comprises a central repository. In some embodiments, the central repository comprises a table storing metadata and a table for performing searches of the metadata. In some embodiments, the search table indicates a correspondence between a metadata term and one or more checksums. In some embodiments, the one or more checksums comprise keys in the table storing metadata.

Certain embodiments contemplate a computer system comprising: a processor; a data storage comprising a file system; and a memory comprising instructions, the instructions, in conjunction with the processor, configured to: determine a change to the file system; transmit a checksum associated with the change to a server system; and transmit a plurality of metadata associated with the change to the server system.

In some embodiments, the change comprises the creation of a new file. In some embodiments, the checksum comprises a checksum of at least a portion of the new file. In some embodiments, the checksum is an MD5 checksum. In some embodiments, to transmit a checksum comprises to transmit data through a firewall.

Certain embodiments contemplate a method for managing a file system comprising: receiving a user command from a user; determining a first action requirement based on the user command; receiving a first connection from a first client system; and transmitting the first action requirement to the first client system using the first connection.

In some embodiments, the user command comprises a request to view a portion of a file system. In some embodiments, the method further comprises: receiving a second connection from a second client system; and transmitting a second action requirement to the second client system using the second connection. In some embodiments, the action requirement comprises an instruction to copy a file. In some embodiments, the first action command comprises a command to create a copy of a file on the first client system and the second action command comprises a command to create a copy of the file on the second client system. In some embodiments, determining a first action requirement comprises determining a replication factor. In some embodiments, the replication factor is greater than two.

Certain embodiments contemplate a method for managing a file system comprising: determining that an email message is available on an email server; retrieving the email message; parsing a command from the email message; receiving a first connection from a first client system; and transmitting a first action requirement to the first client system using the first connection.

In some embodiments, the user command comprises a request to view a portion of a file system. In some embodiments, the first action requirement comprises an instruction to retrieve a file from a memory in communication with the first client system. In some embodiments, the first action requirement comprises an instruction to retrieve a file.

BRIEF DESCRIPTION OF THE DRAWINGS

One or more embodiments of the present disclosure are illustrated by way of example and not limitation in the figures of the accompanying drawings, in which like references indicate similar elements.

FIG. 8A illustrates a table system for metadata management as may be implemented in certain embodiments. FIG. 8B illustrates a search table for metadata management as may be implemented in certain embodiments.

FIG. 12 is a "node view" as may appear in certain embodiments of the generalized diagram of the GUI of FIG. 9.

FIG. 13 is a "settings view" as may appear in certain embodiments of the generalized diagram of the GUI of FIG. 9.

FIG. 29 is a list of configuration settings as may be used in the configuration files of certain embodiments.

DETAILED DESCRIPTION

Figure 1:
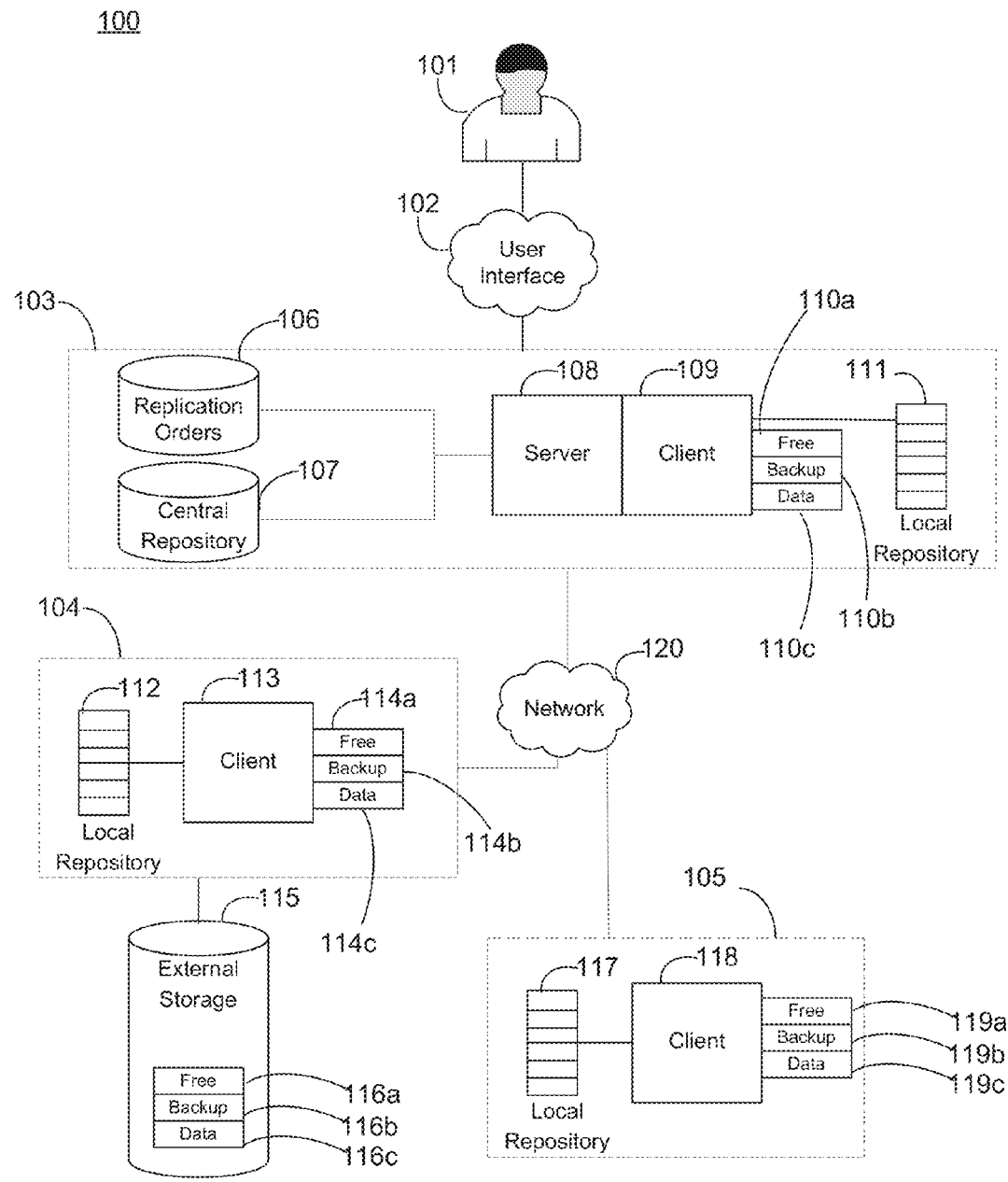
FIG. 1 illustrates a generalized block diagram of a file management topology including a local server system as may be implemented in certain embodiments.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Certain of the disclosed embodiments provide instant and secure access to media from any storage device. In some embodiments, the access is provided even when the storage device is outside a private network (for example, when connected to a public network). In some embodiments, users don't have to remember where files are physically located (which machine, which folder), or have to worry about backing up their data, after the system is installed on a network. These management processes may instead be handled automatically. Because certain embodiments pool together existing free storage scattered across the network into a virtual storage pool, in some embodiments no additional investments in storage hardware is required.

Local System Overview

Certain of the various disclosed embodiments relate to systems and methods for automatically, or manually, classifying, reviewing, maintaining, and replicating data across a plurality of computer devices. For example, in some embodiments the system may replicate data across a plurality of internal and external storage devices connected to various computer systems in a home or business network, such as mobile phones, desktop computers, laptop computers, etc. A user can review and direct replication via an interface in certain embodiments. In some embodiments, the user may use an email system to control and/or monitor the replication. The user may also use the email system to query and access data while outside the network.

FIG. 1 illustrates a generalized block diagram of a file management topology including a local server system as may be implemented in certain embodiments. In these embodiments, a user 101 may interact with a first computing device 103 via a user interface 102. The computing device 103 may be a mobile phone, laptop, desktop computer, tablet device, server, etc. Computing device 103 may be in communication with computing device 104 and computing device 105 via a network 120. Network 120 may be a local area network (LAN) such as a home or office wireless, or wired, Ethernet network. In some embodiments, network 120 is not present and the computing devices are connected directly, e.g. as peripheral connections to one another via wire connections, Bluetooth, etc. Like computing device 103, computing devices 104 and 105 may be, for example, a mobile phone, laptop, desktop computer, tablet device, etc. Computing devices 103, 104, and 105 may be in connection in a peer-to-peer network. Computing devices 103, 104, and 105 may run different operating systems, e.g., Windows variants, Unix variants, Apple Macintosh OS variants, iOS, etc., and may store data in a variety of different file system types.

Various embodiments contemplate installation software which user 101 may run on a computer device 103, 104, and/or 105. The installation software may be downloaded by the user from a website, or retrieved from a computer readable medium, e.g. a compact disc. The installation software may install certain components depicted in FIG. 1, e.g., client process 109, server process 108, central repository 107, etc. In some embodiments, the installation software may be removed following execution. In some embodiments, the installation software remains on the computing device, e.g., device 103, and executes, at least in part, a server process 108 and/or a client process 109.

In some embodiments, the installation software detects devices 104 and 105 across network 120, e.g. using a process described in greater detail below with respect to FIG. 14. In some embodiments, the user may specify the existence of other computing devices manually. The installation software may determine, or the user may specify, that none of the devices 104 and 105 have been installed with the software and that the software is a "first" instantiation in this network. In some embodiments, the software may operate on the JAVA virtual machine, or upon another platform capable of accessing files across a plurality of file and operating systems. Particular modules, configured to accommodate the nuanced behaviors of individual operating and file systems, may be included in the installation software and/or in the client and server processes. In some embodiments, the installation software may include setup packages specific to each operating system. The setup packages may separately install and register required client and/or server processes on the device (e.g. Windows services, Unix daemons, etc.). An update module may automatically download updates from a central server and update the client and/or server processes on one or more of the devices.

In some embodiments, the software may install client processes 113 and 118 directly onto computing devices 104 and 105. In other embodiments, the user may separately install the installation software onto client devices 104 and 105, where the new installations will detect the installation on device 103 and accordingly create only client processes 113 and 118, but no new server processes.

Having determined that it is a first instantiation, the software may create a server process 108, replication/backup orders database 106, and central repository 107 on the computer device 103. Central repository 107 may be used to house an index of the files located on each of the managed computing devices. Replication orders database 106 may house the orders used to specify how, where, and when file replication operations are to be performed.

In some embodiments, the installation software may then direct the creation of client processes 109, 113, and 118 on each of the computing devices 103, 104, and 105. Each client process 109, 113, and 118 may be associated with the free 110a, 114a, and 119a, backup 110b, 114b, and 119b, and data 110c, 114c, and 119c storage portions available on a storage device.

The software or the client processes may also determine storage allocations on other devices which may not have their own client process. For example, client process 113 may identify an external storage 115 connected to computing device 104. External storage 115 may be, e.g., a USB storage device, or any peripheral device possessing its own accessible storage. The storage on the external storage 115 may likewise be identified, e.g. by client process 113, as one of free 116*a*, backup 116*b*, or data 116*c*.

In some embodiments, during the installation process, a client process may scan a computer device and identify accessible local volumes. In the depicted example, because external storage 115 is connected to the device 104, the client process 113 has detected volumes available on external storage 115. In some embodiments, the server or client process may ask the user which of the storage devices should be made available for backups and how much storage should be donated to the storage pool. For example, a user may indicate an amount of space on external storage 115 which can be allocated to backup 116*b*.

Each client process 109, 113, 118, may be in communication with a respective local repository 111, 112, 117. Storage for the local repository 111, 112, 117 may be allocated upon installation of the client process 109, 113, 118, or upon an "as-needed" basis.

Local System Replication Example

Figure 2:
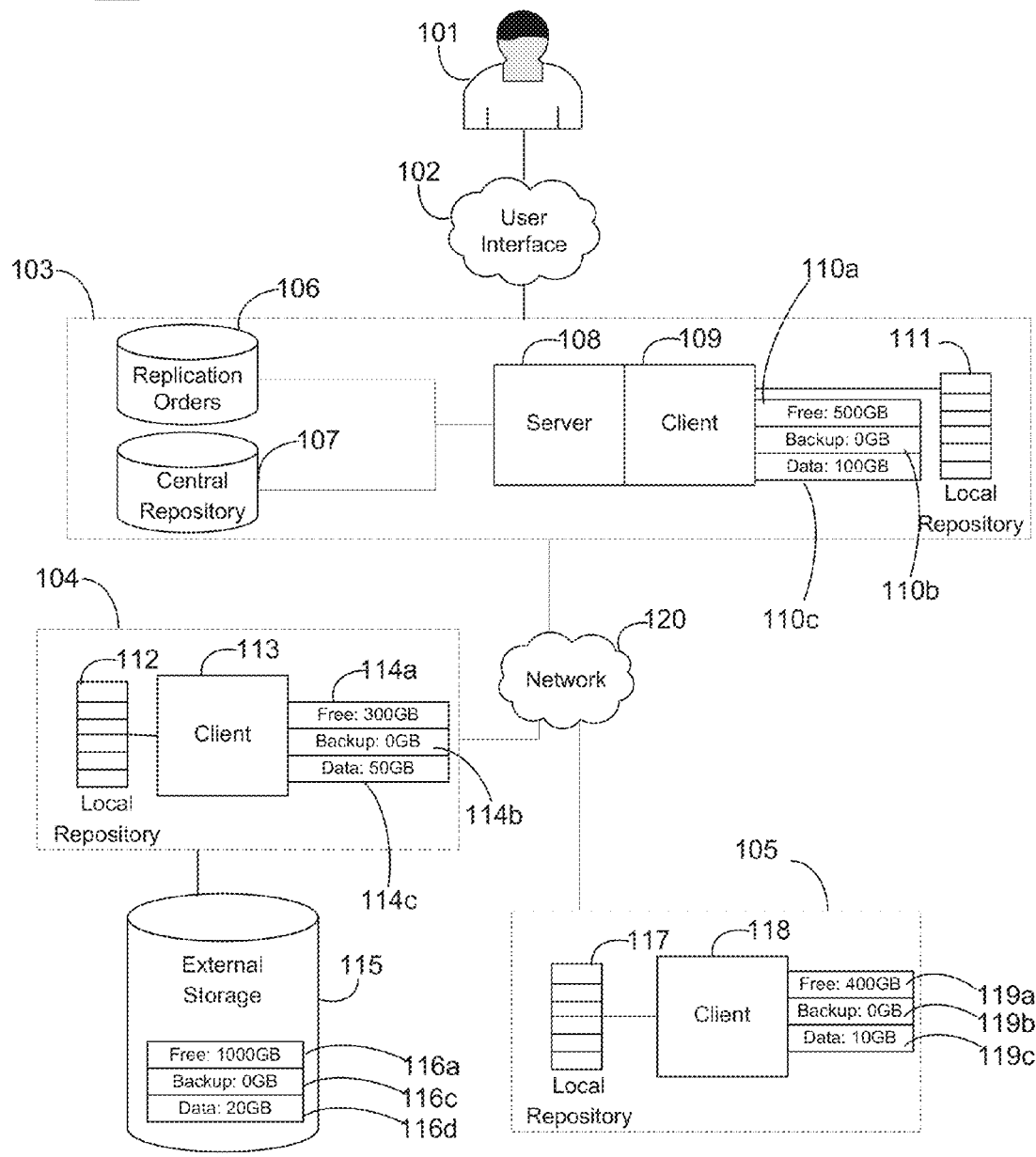
FIG. 2 illustrates an example storage allocation in the topology of FIG. 1.

FIG. 2 illustrates an example storage allocation in the topology of FIG. 1. In this example, the client process 109 has determined that computing device 103 has access to 600 GB of total storage, where 500 GB of the storage are free and 100 GB is allocated to data. Similarly, client process 113 has determined that computing device 104 has 350 GB of total, or accessible, storage, 50 GB of which is allocated to data and 300 GB of which is free. Client process 113 has also determined that external device 115 has 1020 GB of total accessible storage, only 20 GB of which is in use. External device 115 may be a peripheral device connected, e.g., via a USB or BlueTooth interface. Client process 118 has determined that 410 GB of storage are locally available, with 10 GB currently allocated to data.

System Replication Example—Replication Factor N=3

Figure 3:
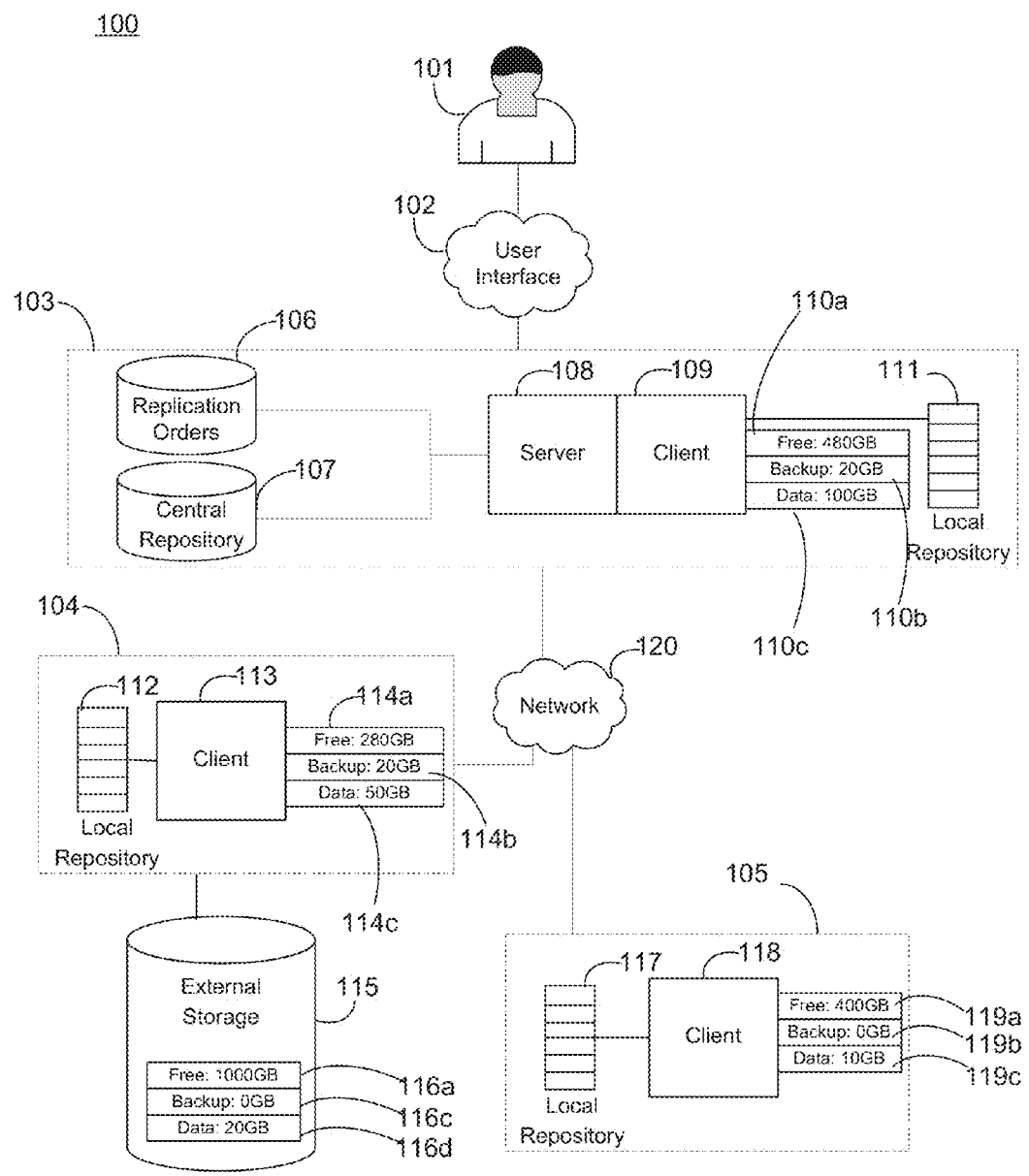
FIG. 3 illustrates an example storage allocation in the topology of FIG. 1 following a replication event with the replication factor set to 3.

FIG. 3 illustrates an example storage allocation in the topology of FIG. 1 following a replication event with the replication factor set to three. The replication factor generally refers to value referenced by the system to determine the number of copies of a file object that should exist. The software system, or the user, may determine that it is important to back up the 20 GB of data on external storage 115. In this example an entire portion of a storage allocated to data in external storage 115 is being replicated, though one will recognize that only a portion of storage allocated to data (e.g., one or two files) may also be replicated. In this example there are two copies of the data in device 103 and device 104.

A replication factor of three may be set at server process 108, either automatically or by user specification. In some embodiments, the server process includes a default mapping of file or device types to a replication factors. For example, image files may be replicated two times by default (replication factor equals two), while operating system configuration files are replicated four times (replication factor equals four). In some embodiments, e.g., Microsoft Office files are replicated three times. Based on the determined replication factor, server process 108 may ensure that at least three copies of the data on the external storage 115 exist on systems in the network (including the original copy on the external storage 115). In this example, the server process 108 has determined that computer device 103 and computer device 104 offer the best locations for backup storage. Accordingly, the storage of computer device 103 and computer device 104 have been updated to include the external storage's 115 backup data as indicated by backup records 110*b* and 114*b*.

System Replication Example—Replication Factor N=4

Figure 4:
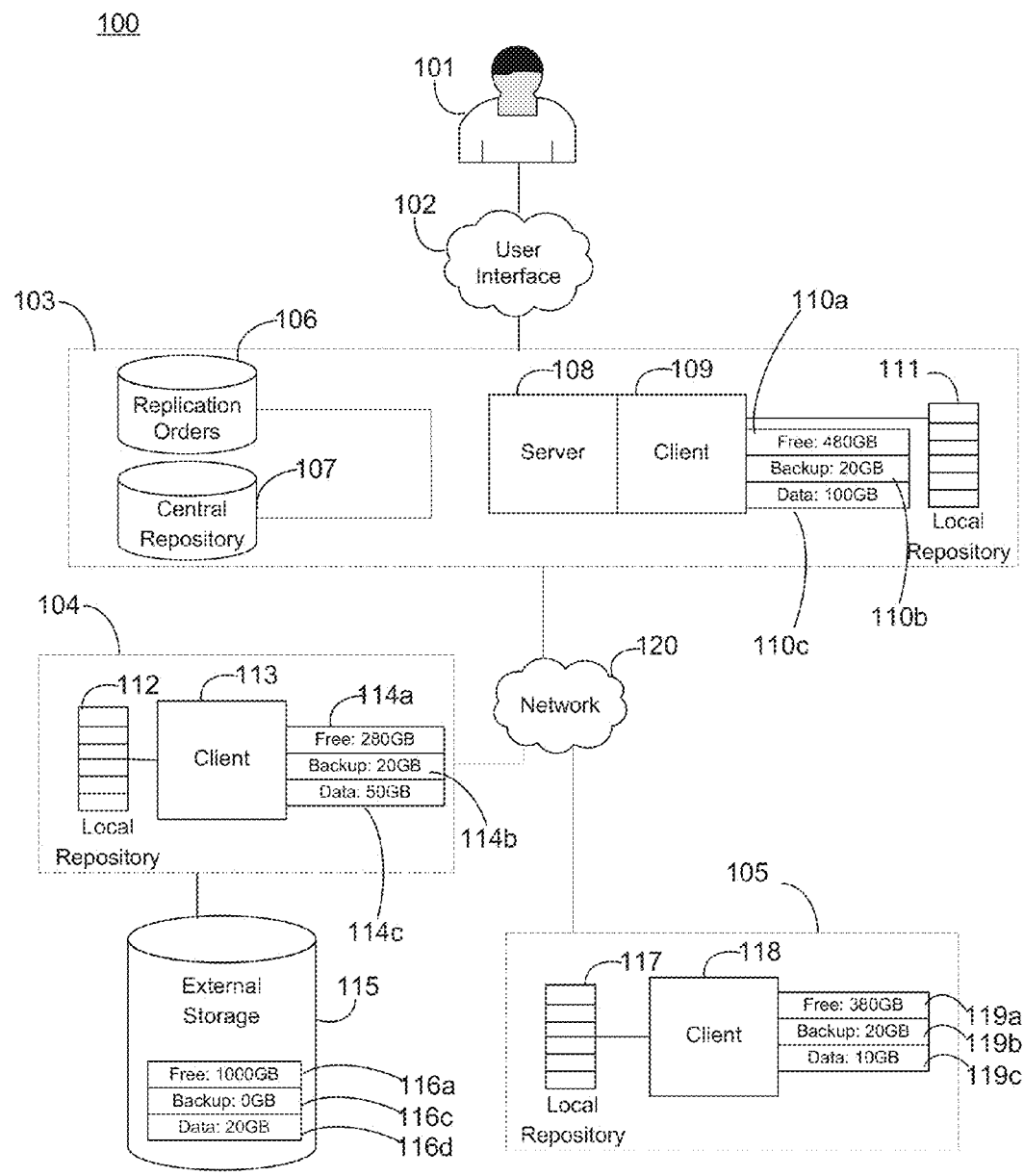
FIG. 4 illustrates an example storage allocation in the topology of FIG. 1 following a replication event with the replication factor set to 4.

FIG. 4 illustrates an example memory allocation in the topology of FIG. 1 following a replication event with the replication factor set to four. In this example, computing device 105 has also been included as the fourth replication site. Computing device 105's memory has also been updated to include the external storage's 115 backup data as indicated by backup record 119*b*. In some embodiments, the optimal devices to create the replicas may be based on a number of factors, including device uptime (e.g., historical availability), free storage, and transfer speeds to/from the device.

Cloud System Overview

Figure 5:
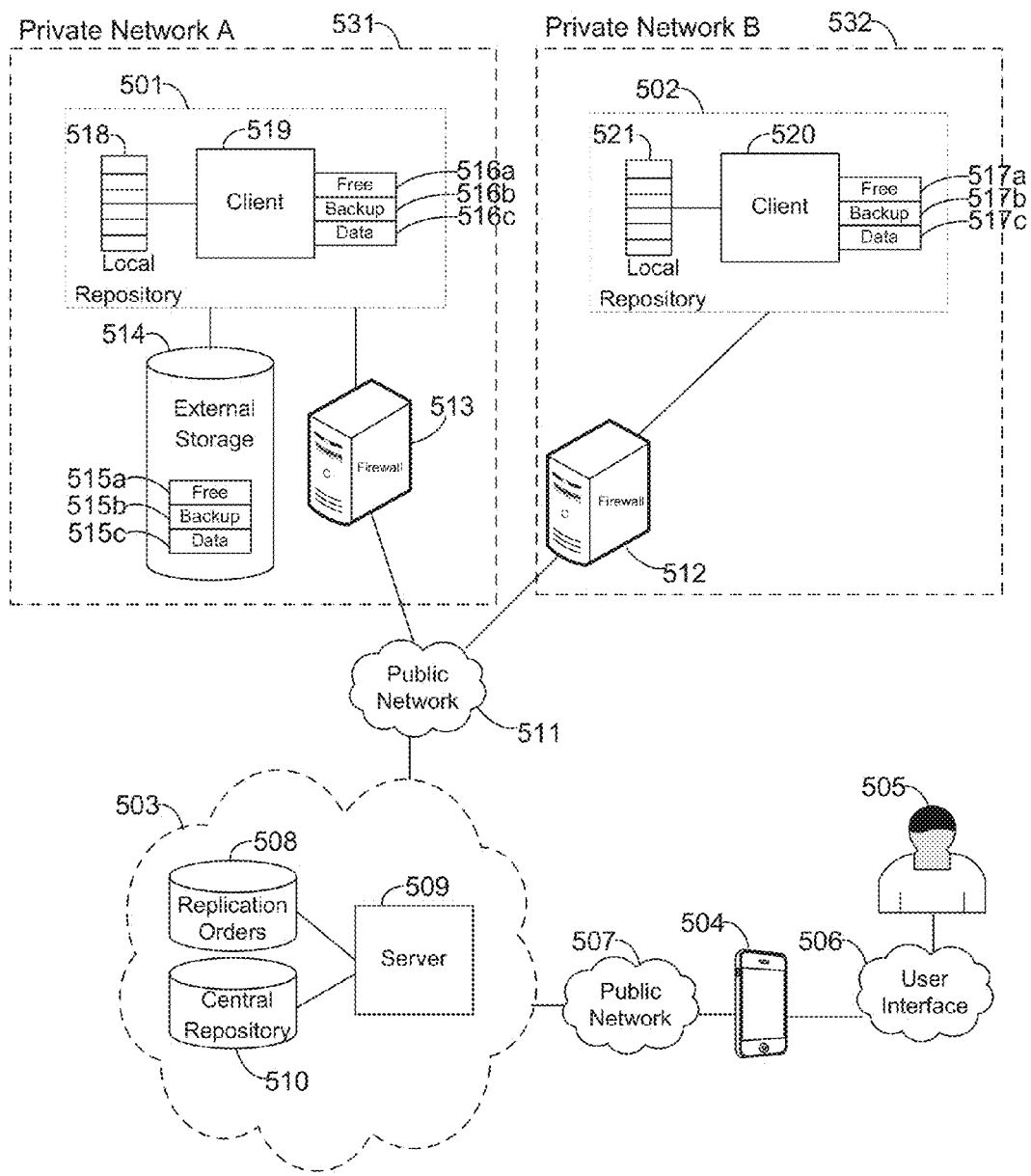
FIG. 5 illustrates a generalized block diagram of a file management topology including a cloud-based server system as may be implemented in certain embodiments.

FIG. 5 illustrates a generalized block diagram of a file management topology including a cloud-based server system as may be implemented in certain embodiments. In the depicted example topology 500, a user 505 may communicate with a device, such as a mobile device 504, via a user interface 506. The mobile device 504 may be in communication with a network 507, such as the Internet. A network computer system, such as a cloud-based computer system 503, may be in communication with the user device 504 via the network 507.

The cloud-based computer system 503, may contain a server process 509, with a replication orders database 508, and a central repository 510. The replication orders database 508 and central repository 510 may operate in a manner similar to replication orders database 106 and central repository 107.

The cloud-based computer system 503 may be in communication with a plurality of private computer networks 531, 532 via a network 511, which may be the same network as 507, e.g. the Internet. As discussed with respect to FIG. 1, computing devices 501 and 502, located on their respective private networks, may be installed with software creating their own client processes 519 and 520.

Firewalls 513 and 512 may monitor and control access to private networks 531 and 532. In some embodiments, the firewalls may permit outgoing connections from computer systems 501 and 502, but may not allow incoming connections, e.g. from cloud system 503. In these circumstances, it may be necessary for client processes 519 and 520 to initiate a connection with cloud based system 503 before they can communicate.

Cloud System Email Control Overview

Figure 6:
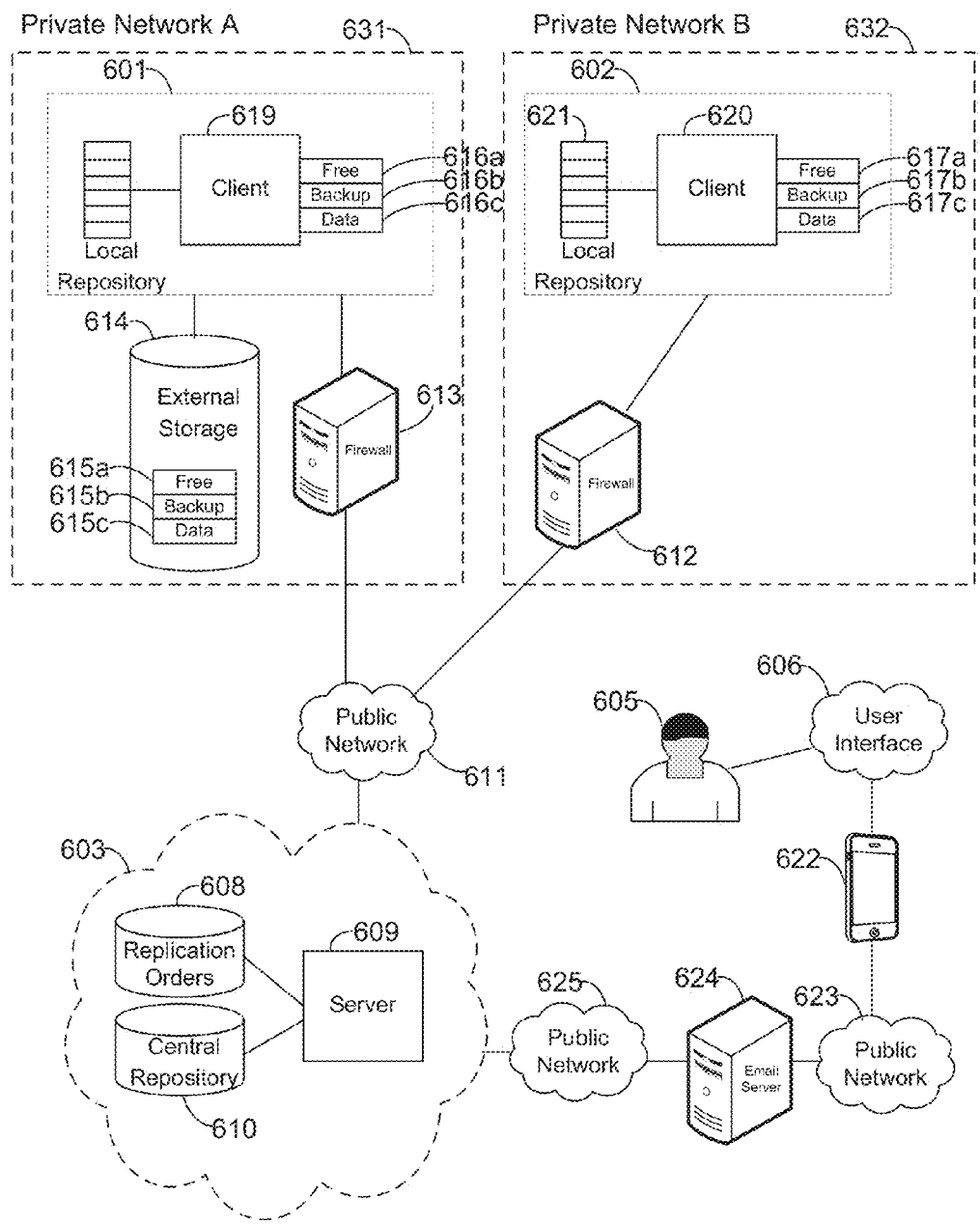
FIG. 6 illustrates a generalized block diagram of a file management topology including a cloud-based server system and an email-based control system as may be implemented in certain embodiments.

FIG. 6 illustrates a generalized block diagram of a file management topology 600 including a cloud-based server system and an email-based control system as may be implemented in certain embodiments of the process. As in the example of FIG. 5, a user 605 may control a user device 622 using a user interface 606. In this example, however, the user may not be able to access, or authenticate with cloud based system 603 directly. Additionally, the user 605 may not be the primary owner, or the sole owner, of the computing devices 601 and 602. The user 605 may not be familiar with the technical characteristics of the system, but may instead only have general familiarity with computers, e.g. the sending and receiving of email.

Accordingly, user device 622 is in communication with an email server 624 via a network 623. Email server 624 and user device 622 may be configured to exchange email information via the Internet Message Access Protocol (IMAP), Post Office Protocol (POP), etc. The server process 609, or an associated module, may also be configured to exchange email information with email server 624 via network 625, which may be the same as network 623 (e.g., the Internet).

Thus, as described in greater detail below, the user 605, may send an email to server 624. The email may contain instructions understandable to server process 609, e.g., instructions for retrieve all objects that match certain criteria, such as all image files created in the past twenty four hours for viewing, or to remove a file from the computer devices 631 and 632. Server process 609 may retrieve the email message, parse the instructions, and perform the requested operation using computing devices 601 and 602. This may be accomplished despite firewalls 612 and 613 using, e.g., the process of FIG. 19. Server process 609 may also provide a responsive confirmation, or output, to user 605 via the email server 624. For example, where the user 605 has requested to view an image file, the server process 609 may retrieve the image file from computing devices 601 and/or 602 and return them as attachments in an email to the server 624 or to another email server accessible by user 605.

Local System Email Control Overview

Figure 7:
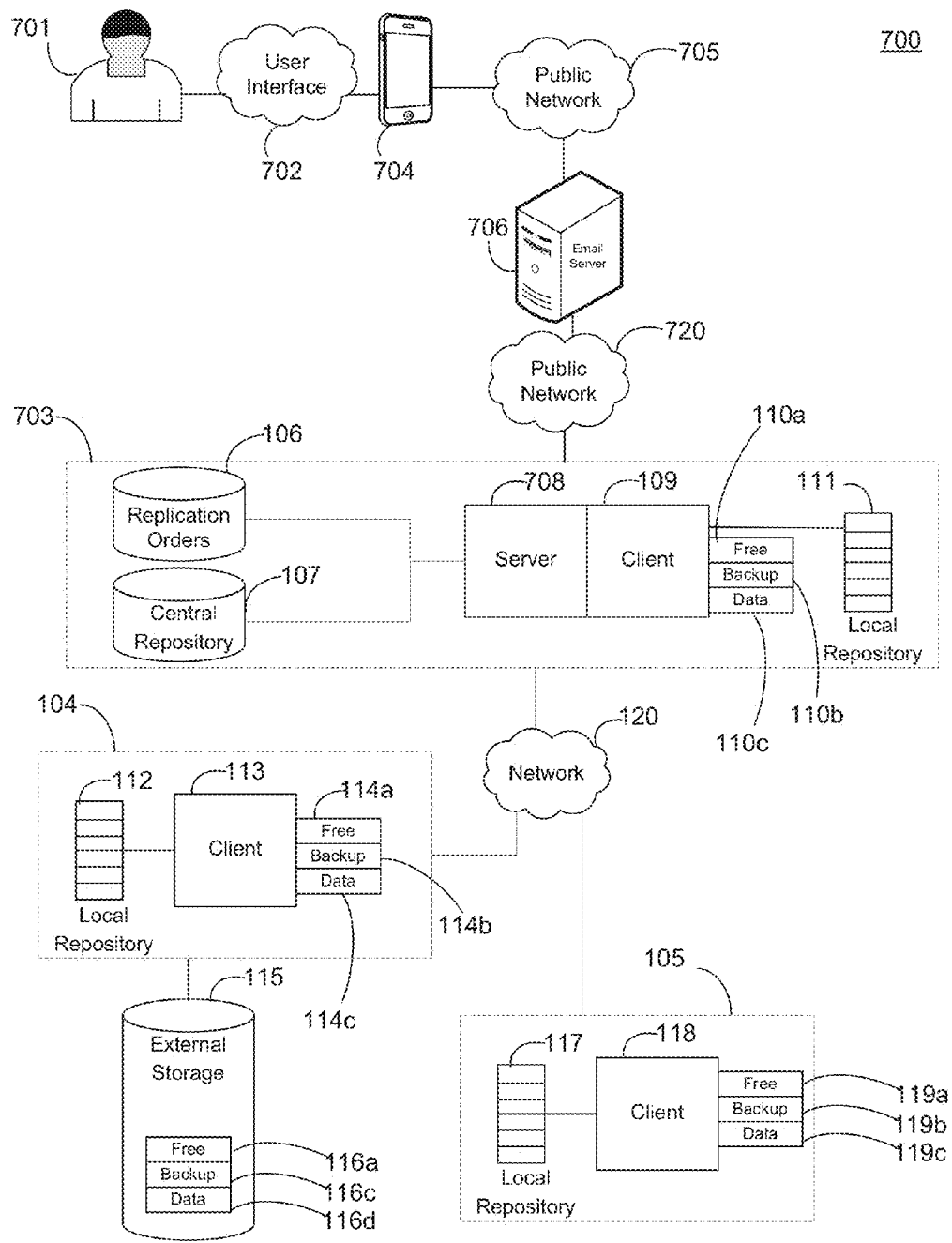
FIG. 7 illustrates a generalized block diagram of a file management topology including a local server system and an email-based control system as may be implemented in certain embodiments.

FIG. 7 illustrates a generalized block diagram of a file management topology 700 including a local server system and an email-based control system as may be implemented in certain embodiments. An email protocol similar or the same as that described above with reference to FIG. 6 may also be used on the local system of FIG. 1. Here, the email server 706 receives commands from the user 701 via user device 704. In some embodiments, the server process 708 may also perform the operations described above with respect to FIG. 1, receiving user commands from the email server 705 or via an interface in direct communication with computing device 703.

Metadata Storage

FIG. 8A illustrates a table system 800A for metadata management as may be implemented in certain embodiments. The table system 800A may be implemented as metadata stored in central repository 107 and/or in local repositories 111, 112, and 117. In some embodiments, the table system 800A is stored as entries in a Structured Query Language (SQL) database. In some embodiments, the table system 800A is stored as entries in a non-relational database. Each row 802*a-d* in the table may reference a unique file instance, which may have multiple copies across the network. The instance may be uniquely identified by a checksum key value 801*a*. The checksum may be the MD5 checksum of the file object. In some embodiments, other metadata stored for each object includes an original file name, file size, date of modification, date of creation, and other media-specific attributes. Further examples include image dimensions for pictures, geotagging data stored in pictures, artist names in music files, etc.

A user, e.g. using an interface such as is described with reference to FIG. 9, may associate tags and other descriptions with a file as part of the file's metadata. For example, in column 801*b* of row 802*a* the user has indicated that the file is associated with "Vegas", e.g. a picture taken in the city of Las Vegas. The metadata may also include entries from the software system, e.g. either the server process or client processes. For example, column 801*c* of row 802*a* indicates a file path to a location of the replicated file on a client device. The system may also indicate security and visibility metadata, for example, by indicating that the file is private to some users (e.g. a limited set) at column 801*b* of row 802*b*.

FIG. 8B illustrates a search table for metadata management as may be implemented in certain embodiments. Were a user to request all files associated with the metadata tag "Vegas" it may be inefficient to search through all the metadata of each file entry in the table 800*a*. Accordingly, certain embodiments contemplate the creation of an intermediate search table 800*b*. The search table may reverse the indexing of metadata values and file checksums. For example, the tag "Vegas" in row 804*a* may be associated with each of the key IDs (e.g. MD5 checksums) to which the tag is associated (e.g., d131dd02c5e6eec4 and 41bed109c9eaeec2).

Graphical User Interface

Figure 9:
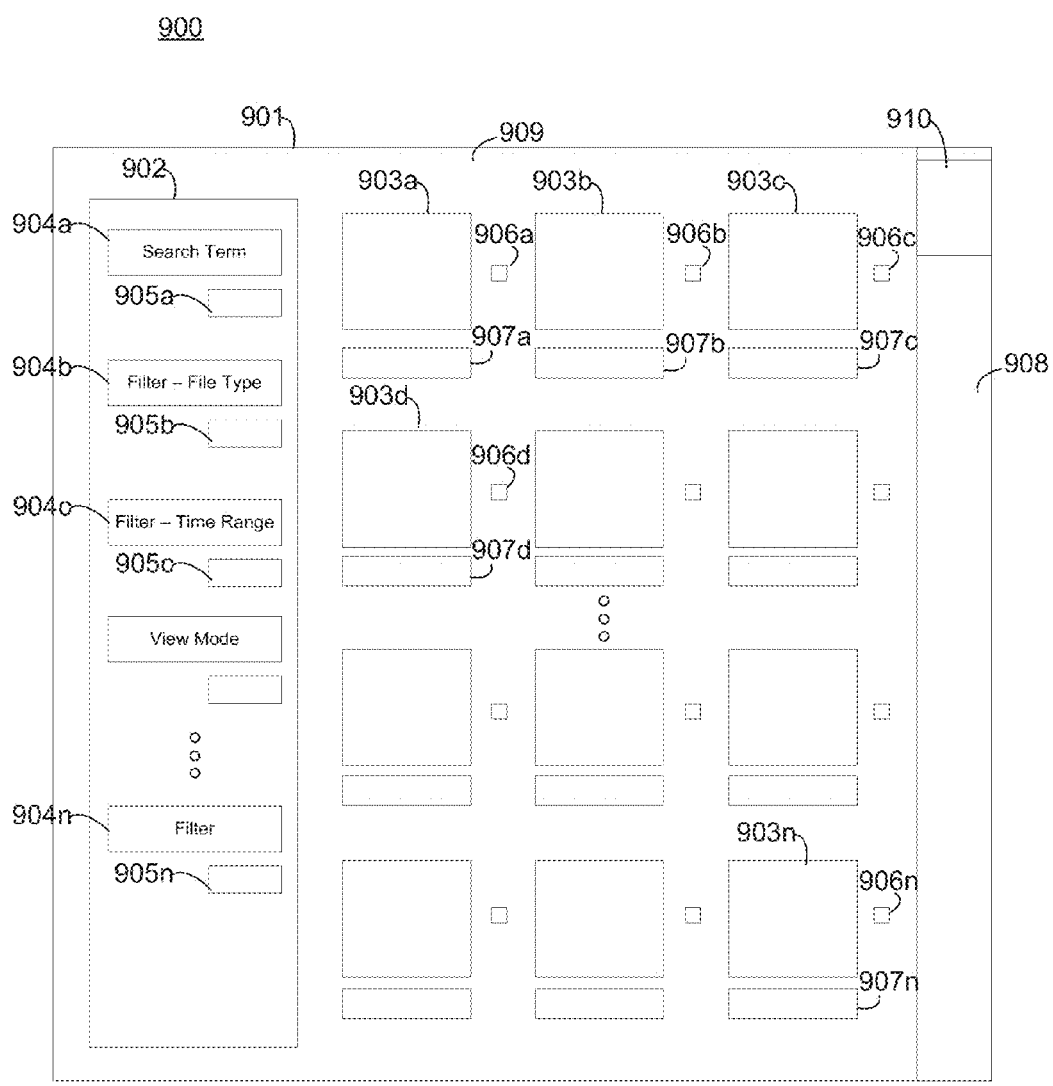
FIG. 9 is a generalized diagram of a Graphical User Interface (GUI) as may be implemented in certain of the embodiments.

FIG. 9 is a generalized diagram of a GUI 900 as may be implemented in certain of the embodiments. The interface may be part of an user interface, e.g. interfaces 102, 506, etc. The GUI 900 may include a filter control region 902 and a file display region 909. Within the filter control region 902 may be a plurality of inputs 904*a-n*. Inputs 904*a-n* may include icons, text inputs, radio buttons, sliders, etc. available to the user to specify search and filtering criteria.

Based on the criteria, the system may populate the display region 909 with a plurality of icons 903*a-n*. Each icon may be associated with a plurality of controls 907*a-n* and check boxes 906*a-n*. Check boxes 906*a-n* may be used to apply actions to a selected set of selected objects. Actions may include viewing an object, loading an object locally using default applications for a file type, applying a tag, hiding an object from appearing in the future, making a file private (hidden from other users or a subset of users), opening a file locally, sending a file via email, etc. Controls 907*a-n* may include file type filters (e.g. show only images), time filters (e.g., files created last week), view modes (full screen, preview, etc.), a number of results to show per pages, etc.

In some embodiments, the user may perform metadata curation through the GUI 900. Controls 907*a-n* may include an input for receiving metadata to be associated with a file indicated by the corresponding icon 903*a-n*. Curation may be automated in some instances. For example, some mobile devices store geolocation information with a file, e.g. a photo, when it is saved to memory. Upon encountering these files, a server or client process may extract the geolocation information and include it, or a corresponding term, in the metadata associated with a file.

Slider 910 may be used in sliding region 908 to scroll among the displayed icons 903*a-n*.

Figure 10:
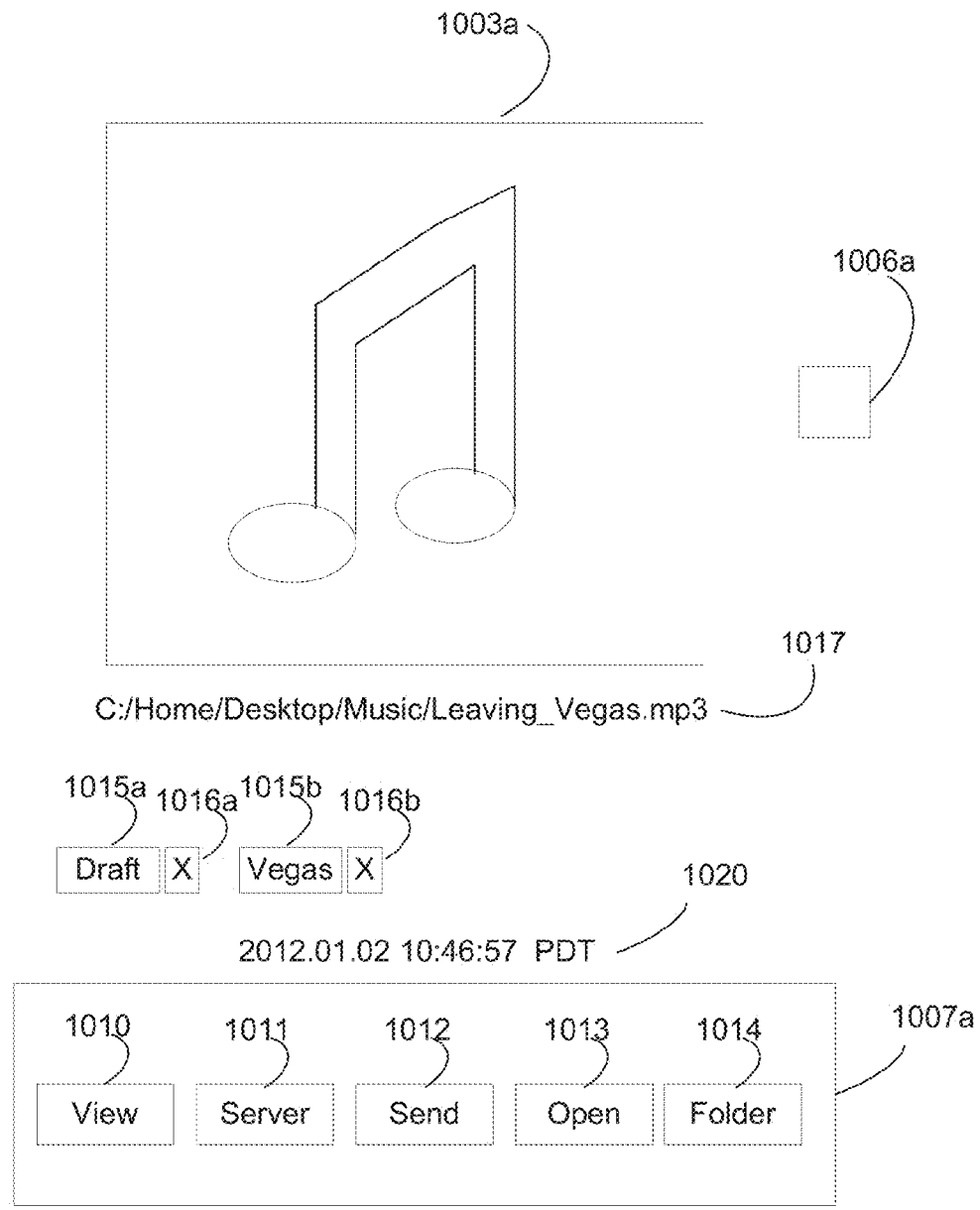
FIG. 10 is an enlarged view of a file indicator as may appear in certain embodiments of the generalized diagram of the GUI of FIG. 9.

FIG. 10 is an enlarged view of a file indicator as may appear in certain embodiments of the generalized diagram of the GUI of FIG. 9. A checkbox 1006*a* may be used to select the file. Icon 1003*a* depicts several notes in this example to indicate that the file is a music file. A location indication 1017 may indicate the path (relative or full) to the file and the file name. A user may tag the file with metadata, e.g. "Draft" and "Vegas", using tags 1015*a* and 1015*b*. The tags may be removed by clicking close icons 1016*a* and 1016*b*.

A timestamp indicator 1020 may indicate when the file was created or last modified. Controls 1007*a* may include, e.g., a view control 1010, a server control 1011, a send control 1012, an open control 1013, and a folder control 1014. View control 1010 may be used to view an image of the file contents. Send control 1012 may be used to forward the file, or a copy of the file, to another location or user. Open control 1013 may be used to open or execute the file with an applicable local program (e.g., open an XLS file with Microsoft Office). Folder control 1014 may be used to view the folder in which the file is located.

Figure 11:
FIG. 11 is a "batch view" as may appear in certain embodiments of the generalized diagram of the GUI of FIG. 9.

FIG. 11 is a "batch view" as may appear in certain embodiments of the generalized diagram of the GUI of FIG. 9. In some embodiments, a control panel 1113 may be used to monitor server processes, including e.g., processing the status of incoming update packets sent from clients, determining the state of various client processes connected to a server, and to switch between various views of the GUI. The "batch view" may include a batch ID column 1101. A number of files column 1102 may indicate the number of files that were included for the batch. An insert column 1103 may indicate the number of metadata tokens added for the batch. An insert autocomplete column 1104 may indicate the number of autocomplete tokens added for a batch. An insert hash column 1105 may indicate the total number of tokens added for a batch. An nRetry column 1106 may indicate the number of retries that occurred when attempting to store the data into the central repository. A skip sub folders column 1107 may indicate the number of folder tokens that were skipped (not indexed in 800*a* and/or 800*b*), e.g. because the string length exceeded the maximum string length for a string to be added into the repository as metadata. A skip sub strings column 1108 may indicate the number of substrings that were skipped because the string length is below the minimum string length for a substring to be added as a metadata token into the repository. A timestamp end column 1109 may indicate the system time when the processing ended for the batch. A timestamp start column 1110 may indicate the system time when processing started for the batch. A uuid column 1112 may indicate a unique ID associated with the client process that notified the server of this batch of files.

FIG. 12 is a "node view" view as may appear in certain embodiments of the generalized diagram of the GUI of FIG. 9. Nodes may be client or server processes, or both. The view may depict a unique id column 1201 indicating a unique device identifier (UUID) associated with a client process. The view may also include an IP address column, indicating the client process' current IP address 1202 and an IP port column 1203 indicating the port on which the client process is receiving requests from the server or other clients. Back up column 1204 may indicate whether the client process is able to back up data. Free space column 1205 may indicate how much free space is available on the client process for backups. Configuration column 1206 may provide links to configuration management pages for the client process. Synchronization column 1207 may indicate whether synchronization is enabled for the client. Last batch column 1208 may indicate the ID of the last batch ID that was processed by the client. Last sequence column 1209 may indicate the ID of the current batch sequence that is being processed by the client.

Figure 13:
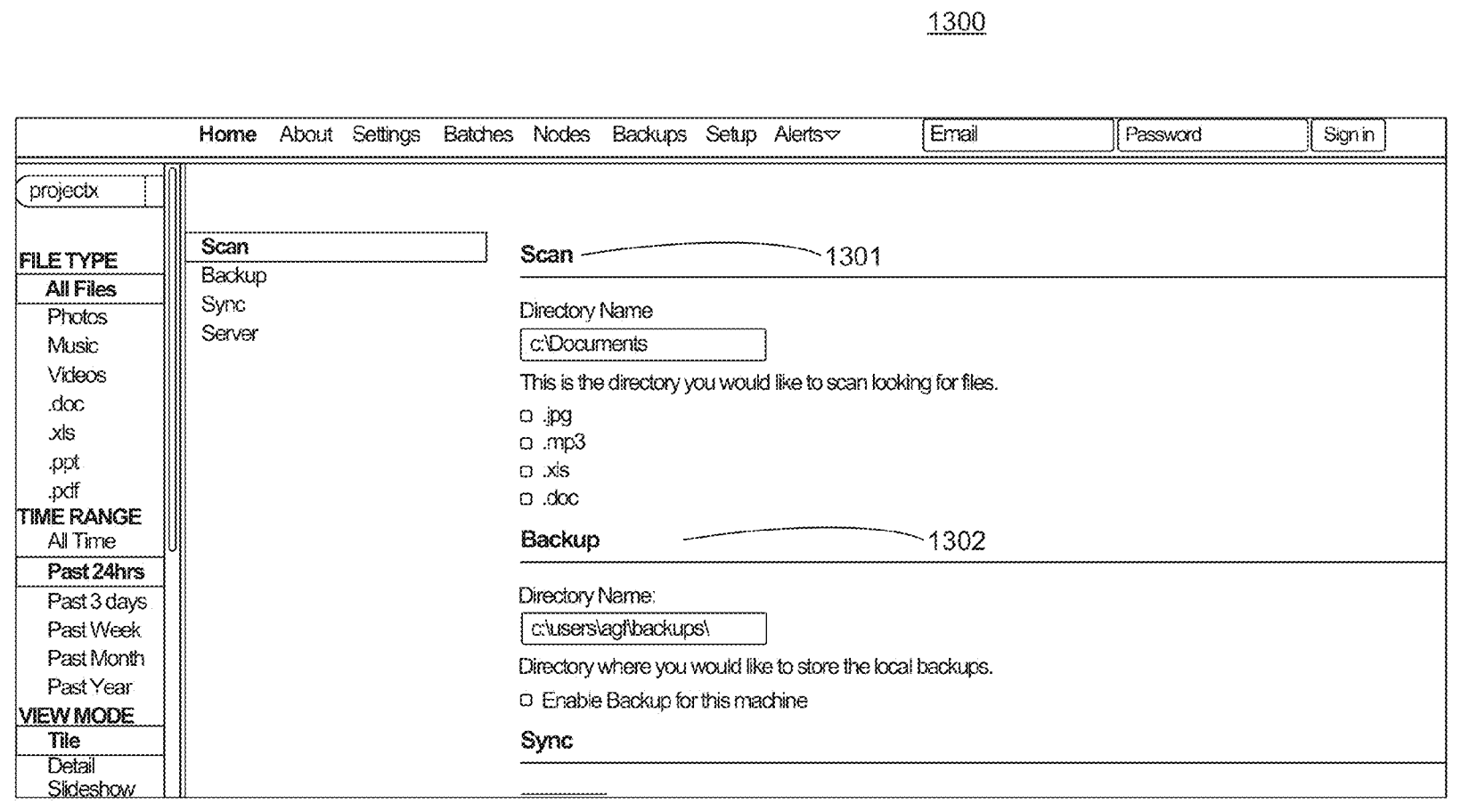

FIG. 13 is a "settings view" as may appear in certain embodiments of the generalized diagram of the GUI of FIG. 9. The settings view may depict a scan configuration input 1301 and a backup configuration input 1302. The scan configuration input 1301 may be used to indicate a directory to be scanned and particular file types to search for storing in the central repository and back up. In the backup configuration input 1302 the user may specify where the backups are to be stored locally on a client process, e.g. the client process 109 or client process 113.

Installation and Device Detection Process

Figure 14:
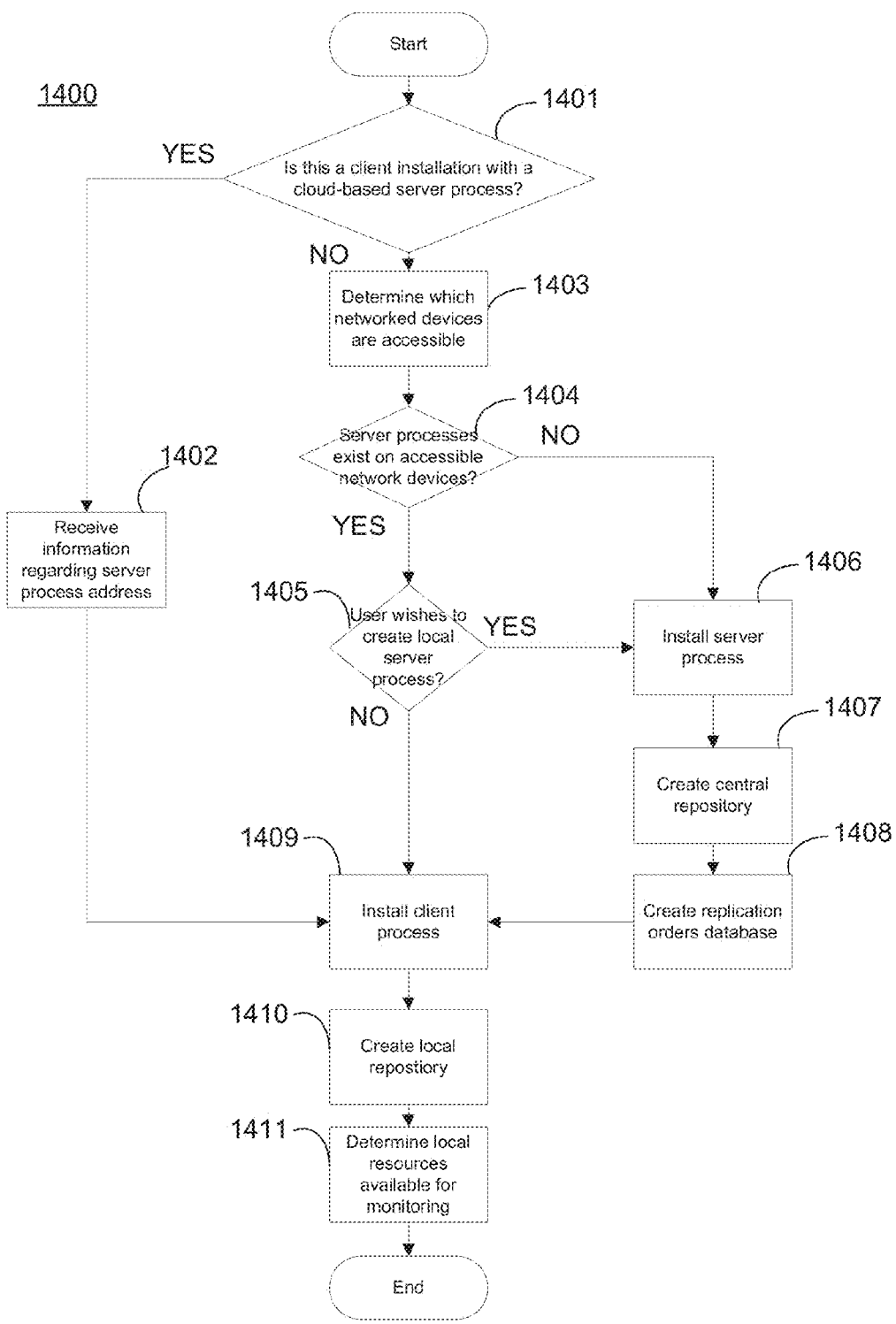
FIG. 14 is a flow diagram depicting certain steps in a setup installation and server detection process as may be implemented in certain of the embodiments.

FIG. 14 is a flow diagram depicting certain steps in an installation and device detection process as may be implemented in certain of the embodiments. The process may be performed by certain implementations of the installation software described above with reference to FIG. 1.

At step 1401 the software may determine whether the installation is for a local network (e.g. FIG. 1) or for communication with a cloud server process (e.g. FIG. 5). For example, the installation software may ask a user to specify which type of installation is desired. In some embodiments, the installation software will be specifically designed for one or the other installation type and will not need to perform the check. In some embodiments, the software may allow for both types of installations, creating a server process locally for local management, but also specifying that the installed client processes provide updates to a remote server process on another device.

If the installation software determines that a cloud-based server process is to be used, at step 1402 the software may receive information regarding the server process address, e.g. from a user. In some embodiments, the address of the cloud-based server may be decided as part of the product registration and activation process, which may involve a user.

At step 1409, the system may install a client process. In some embodiments, installing the client process may include specifying that at least a portion of the software system operate as a client process when it is next executed or that a new thread to perform the operations of the client process be created. In other embodiments, installing the client process may include an update process, which is done by downloading or retrieving compiled code from a central server and placing the code on the computing device, e.g. as part of a client update process.

At step 1410 the system may create a local repository for use by the client process. The local repository may be a local file that stores a record for each file found by the client process. Each file record may contain the MD5 checksum of the file, and the timestamp, of the last file modification.

At step 1411 the system may determine the local resources available for monitoring, possibly via the client process.

If the installation is instead for use with a local, rather than a cloud-based, server process, the software may proceed to step 1403 and determine which networked devices are accessible to the computing device on which the software is to be installed.

At step 1404 the software may submit a query to the determined networked devices or otherwise determine if one or more server processes are running on the accessible network devices.

In some embodiments, if more than one server process is detected on the network, the software presents the user with a list of server processes to choose from. In some embodiments, the user can always choose to create a new server on the same computer device if desired (e.g., at step 1406 discussed below).

In some embodiments, the server process sends a broadcast notification periodically on the Internet Protocol (IP) channel 255.255.255.255. In some embodiments, the client processes listens for server broad notifications periodically on the Internet Protocol (IP) channel 255.255.255.255. In these embodiments the server process may wait passively, anticipating connections from client processes. In some embodiments, the server process is configured to open a specified port on its computing device for receipt of client process server queries. This port may also be hardcoded into the client processes or specified by a user. If no server processes are running on the accessible network devices, then the software may install a local server process at step 1406.

At step 1405 the software may determine if the user wishes to create a local server process. For example, a user may wish to ignore the existence of another server process and create a new server process to manage files. If the user desires installation of a local server process, the software may proceed to step 1406.

If the software does not receive a response from a server process prior to the timeout, the software may proceed to step 1406 and begin installation of a server process on the computing device on which it runs, or upon a computing device determined to be most favorable to execution of the server process. In some embodiments, installing the server process may include specifying that at least a portion of the software system operate as a server process when it is next executed or that a new thread to perform the operations of the server process be created. In other embodiments, installing the server process may include downloading or retrieving compiled code performing the server process operations and placing the code on the computing device.

At step 1407 the software may create a central repository, e.g. central repository 107, for use by the server process. At step 1408 the software may create a replication orders database, e.g. replication orders database 106, for use by the server process in the network. The replication orders may be generated by the server process, as new batches are sent by client processes and added into the system.

The software may then proceed to step 1409 and begin installation of the client process. If a server had been detected at step 1404, the installation software may also proceed to the client process installation, without creating a new server process.

Although reference herein is made to server and client "processes", one will recognize that the term is here being used to refer to a general collection of instructions, which may be implemented as one or more threads, processes, applications, etc. Thus, the server or client process may represent an application or collection of applications, which may themselves be multithreaded, running on one or more computer devices.

Client System Scanning and Update Process

Figure 15:
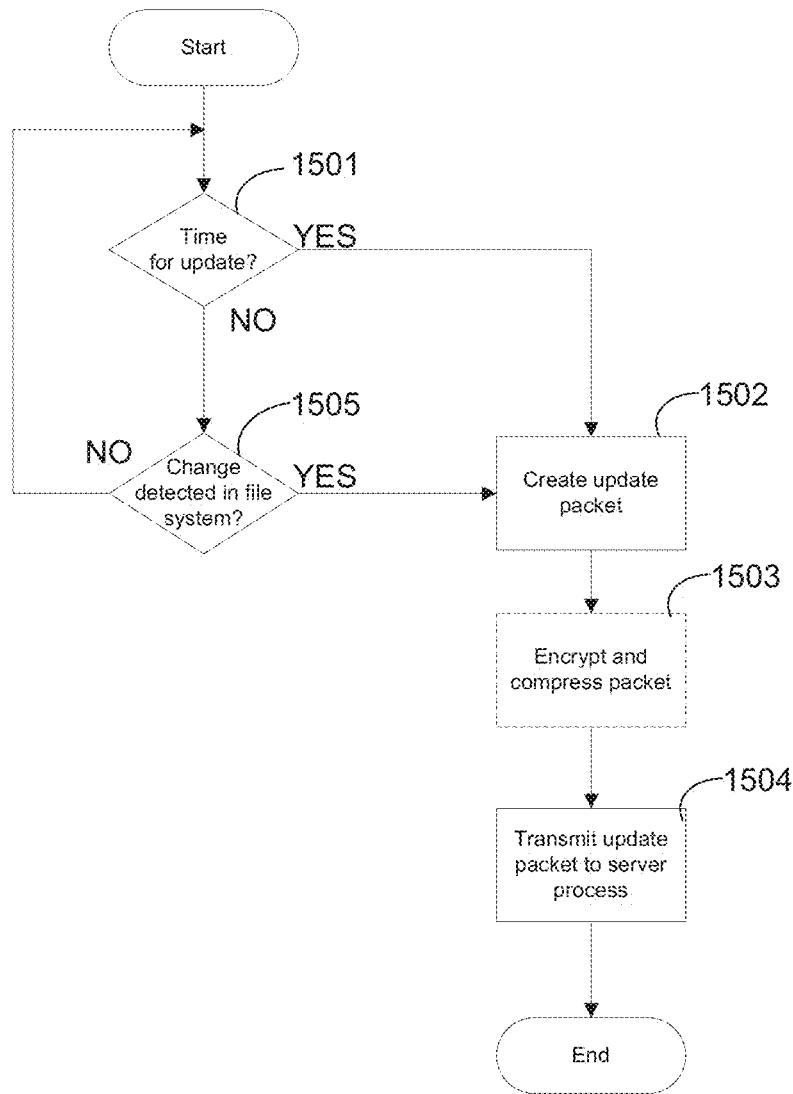
FIG. 15 is a flow diagram depicting certain steps in a client system update process as may be implemented in certain of the embodiments.

FIG. 15 is a flow diagram depicting certain steps in a client system update process 1500 as may be implemented in certain of the embodiments. Update process 1500 may be used by a client process to notify a server process of e.g, changes in its free space, changes to its device's IP address, etc. At step 1501 the system may determine if an update is appropriate. Updates may be specified to occur periodically in time.

In some embodiments, even when it may not be time for an update, the client process will transmit relevant changes to the server process whenever they are identified. For example, when the free space is low, the system may notify the client process that the backups have been disable for this client process, until more storage is added. Accordingly, at step 1505, the system may determine if a change has occurred and create a packet for transmittal otherwise. If no change is detected, the system may determine if it is time for an update.

If an update is appropriate, at step 1502, the system may create an update packet. The update packet may contain metadata and file information indicating the changes made to the file system. Changes and other information that may be available in the update packet include the IP address/port of the device, the free space available on the device for backups, whether backups are active/inactive on the device, whether synchronization is active/inactive on the device, etc.

In some embodiments, at step 1503, the system may encrypt and compress the update packet before forwarding it to the server process. Encryption may help ensure the user's privacy by preventing eavesdropping. In some embodiments the server process may be located across a public network or at a distant location, with many intervening third-party routers.

At step 1504, the system may transmit the update packet to the server process. The update packet may indicate the IP address of the client process's computer device and the character of the storage space available to the computer device. Where the client process and server process are located on the same computer device, in some embodiments the client may deliver the update packet directly via a local file or buffer exchange, rather than transmitting the files across a network, e.g. via the hyper text transfer protocol (HTTP).

Server Process Update Packet Reception

Figure 16:
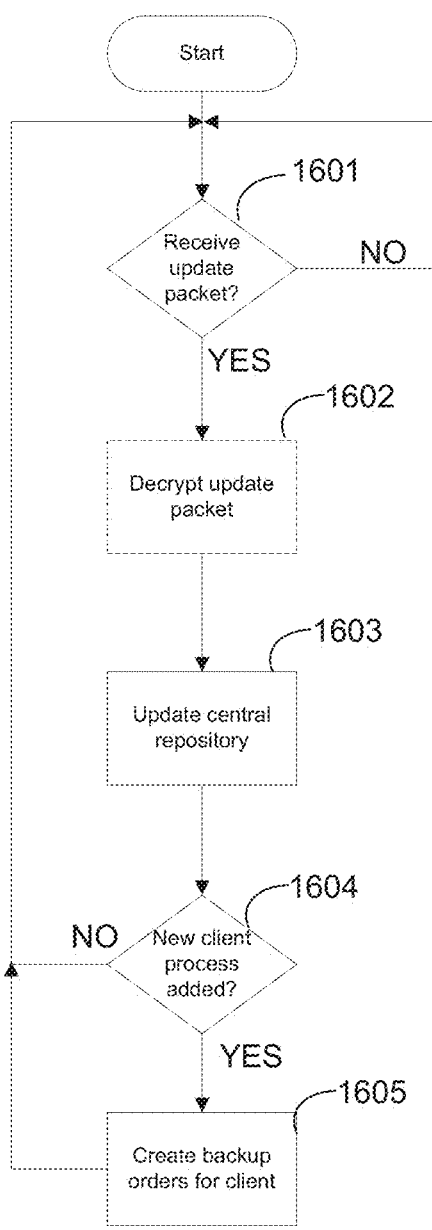
FIG. 16 is a flow diagram depicting certain steps in a server system update packet reception process as may be implemented in certain of the embodiments.

FIG. 16 is a flow diagram depicting certain steps in a server process update packet reception process as may be implemented in certain of the embodiments. At step 1601 the system may receive an update packet from a client process. In some embodiments, the server process may open an HTTP port on the server process' device to receive connections from inbound client processes. In some embodiments, inbound files (files going to the server process) may be transferred via HTTP POST requests, while outbound files (files requested by a client process) may be transferred via HTTP GET requests. At step 1602 the system may decrypt the update packet, if it had been encrypted, e.g., at step 1503, of FIG. 15.

At step 1603 the server process may update the central repository to reflect the changes and metadata contained in the update packet. This may include, for example, a change in IP address for the client device, or the decrease of space available for future backup storage. At step 1604 the system may determine if additional replication among the existing client processes is necessary based on the addition of a new client process. If replication is necessary, e.g. when the update packet specifies a new file needing replication, or the permanent elimination of a storage device, etc., the server process may create new backup orders at step 1605 to ensure that the number of file copies is consistent with the replication factors defined in the system by creating the appropriate backup orders.

Backup Order Processing

Figure 17:
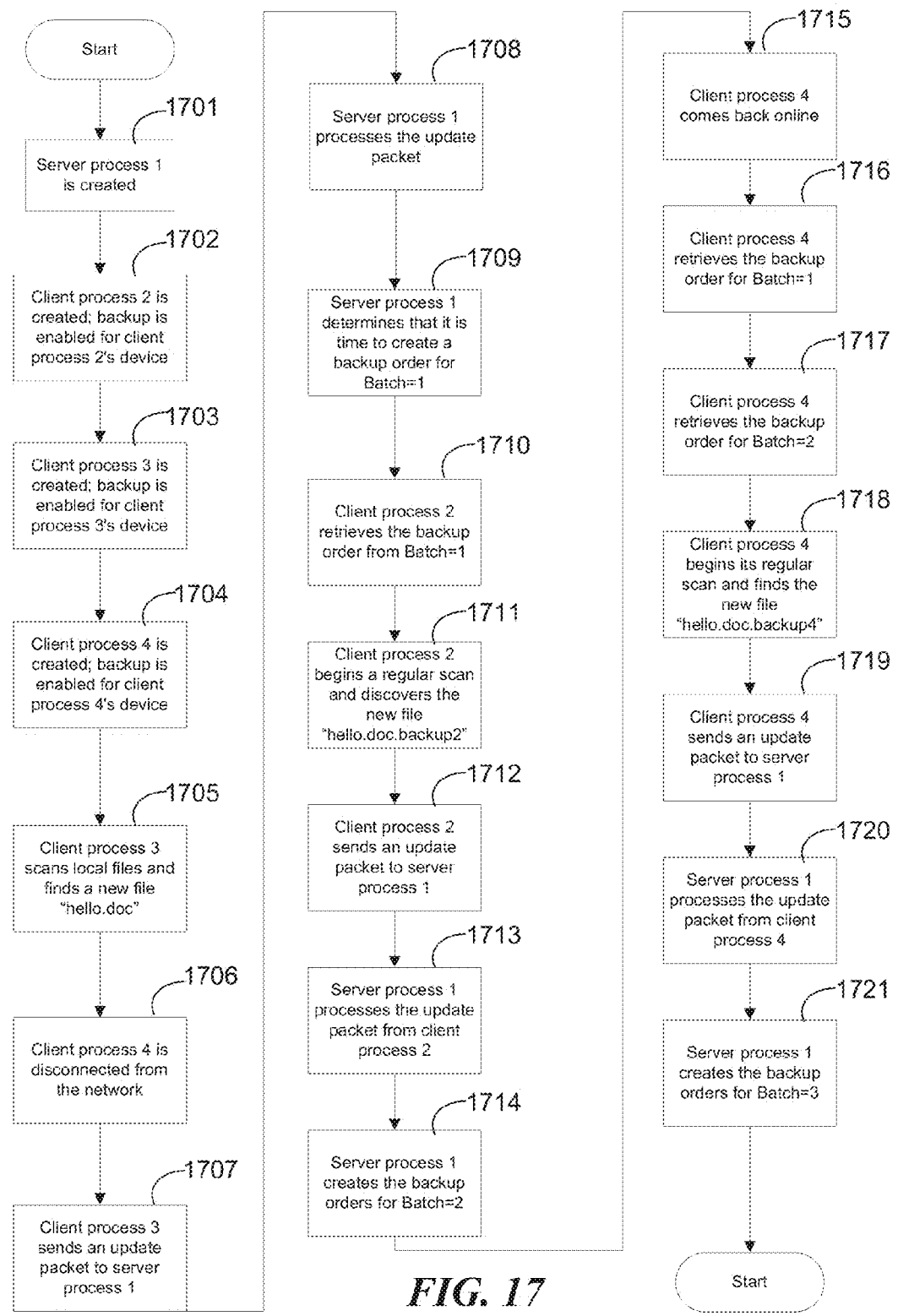
FIG. 17 is a flow diagram depicting certain events in an example backup order process as may occur during the operation of certain of the embodiments.

FIG. 17 is a flow diagram depicting certain events in an example backup order process as may occur during the operation of certain of the embodiments. In this example file backup sequence the replication factor N=3.

At step 1701 server process 1 is created and added into the system. At this point, the Batch=0 because no batches have yet been processed and added into central repository.

At step 1702 client process 2 is added into the system. Backup is enabled for this device. At step 1703 client process 3 is created and added to the system. Backup is enabled for this device. At step 1704 client process 4 is added into the system. Backup is enabled for this device.

At step 1705 client process 3 scans files and finds a new file "hello.doc". At step 1706 client process 4 is turned off or otherwise disconnected from the network. At step 1707 client process 3 sends an update packet to Server 1. The update packet may contain all the metadata of file "hello.doc", including the checksum of the file, the full path name of the file, file size, and timestamp of modification.

At step 1708 server process 1 processes the update packet received. A new batch is created (batch=1). The file "hello.doc" is stored in the central repository and associated to Batch Id=1. The Batch Id=1 may now be visible in the batch view (FIG. 11).

At step 1709 server process 1 determines it is time to create the backup order for Batch ID=1. Since replication factor=3 and there is only one copy of the file (the original file in client process 3), two additional copies of file are needed. Server process 1 creates a backup order for 2 additional nodes available, client process 2 and client process 4. Note that client process 4 is currently down but only temporarily, unless it's down for an extended period of time, e.g. 30 days, in which case it's considered a dead node in certain embodiments.

In this example, at this time the backup orders created on server process 1 will look as follows:

Backup order for client process 2, Batch 1: (filename "backup_Client2_1")<MD5file>, .doc, <full path URL to file on client 3>, hello.doc.

Backup order for client process 3, Batch 1: <empty>.

Backup order for client process 4, Batch 1: (filename "backup_Client4_1")<MD5_file>, .doc, <full path URL to file on Client 3>, hello.doc.

At step 1710, client process 2 retrieves the backup order for Batch=1, which contains 1 record. Client process 2 issues a request client process 3 for the file "hello.doc". A copy of the file is stored locally "hello.doc.backup2". At step 1711, client process 2 begins its regular scan and finds the new file "hello.doc.backup2". To notify the server process, it sends an update packet to server process 1 at step 1712. The update packet may contain all the metadata of file "hello.doc.backup2".

At step 1713, server process 1 processes the update packet received from client process 2. A new batch is created (batch=2). The file "hello.doc.backup2" is associated to Batch=2.

At step 1714, server process 1 creates backup orders for Batch=2. The backup order for client process 2, Batch2, will be empty, because client process 2 already has a copy of the file. The backup order for client process 4 is created. Because the file is available for download on two nodes (client process 2 and client process 3), two records are created in the backup order for client process 4. Thus, at this time the backup orders look as follows:

Backup order for client process 2, Batch 2: <empty>.
Backup order for client process 3, Batch 2: <empty>.
Backup order for client process 4, Batch 2: File_MD5, .doc, <URL on client process 2>, hello.doc.backup2; File_MD5, .doc, <full path URL to file on client process 3>, hello.doc.

At step 1715 client process 4 comes back online. At step 1716, client process 4 retrieves the backup order for Batch=1 which contains 1 record. Client process 4 may then issue a request to client process 3 requesting a copy of file "hello.doc". A copy of the file is stored locally "hello.doc.backup4" at client process 4.

At step 1717, client process 4 retrieves the backup order for Batch=2 which contains 2 records. Because the file already exists locally (as hello.doc.backup4), client process 4 skips the request to client 3 for the file, and also skips the request to client process 2 for the file.

At step 1718, client process 4 begins its regular scan and finds the new file "hello.doc.backup4". To notify the server process 1, client process 4 sends an update packet to server process 1 at step 1719. In this example, the update packet contains all the metadata of file "hello.doc.backup4".

At step 1720, server process 1 processes the update packet received from client process 4. A new batch is created (batch=3). The file "hello.doc.backup4" is associated to Batch ID=3.

At step 1721, server process 1 creates backup orders for Batch=3. The backup order for client process 2, will be empty, because client process 2 already has a copy of the file. The backup order for client process 4 will be empty, because it also has a copy of the file.

Backup order for client process 2, Batch 3: <empty>.
Backup order for client process 3, Batch 3: <empty>.
Backup order for client process 4, Batch 3: <empty>.

At this point there are 3 copies of the file in the network. The original is in client process 3, and there are 2 replicas: client process 2 and client process 4. One will recognize that the events in FIG. 17 are provided merely for purposes of explanation as an example of the behavior of a system in certain embodiments. Although depicted as a linear sequence of events in FIG. 17, like all the figures, one will recognize that the steps may occur in a different order and with various intervening events. For example, many of the system operations may occur in parallel threads. Due to the parallelized nature of the system design, in some embodiments, if client process 4 had not disconnected from the network at step 1706, then the steps 1710 and 1715 would have executed in parallel, since these steps take place in two independent client processes, running on two separate devices. In certain embodiments, each client process may be an autonomous entity, and will attempt to retrieve the files from all clients included in the backup order, until at least one client is available on the network and able to fulfill the request.

Client System Scanning Process

Figure 18:
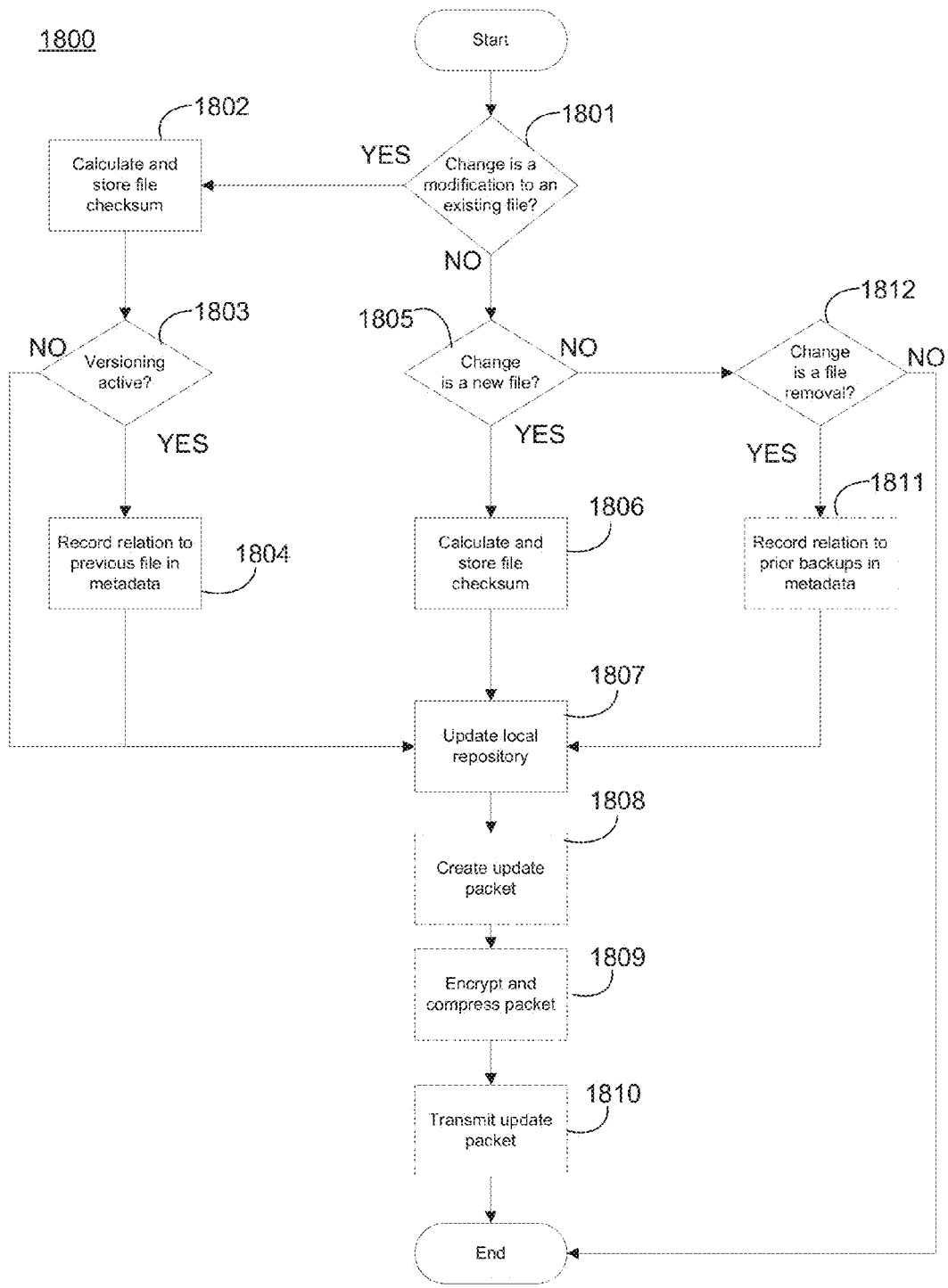
FIG. 18 is a flow diagram depicting certain steps in a client system scanning process as may be implemented in certain of the embodiments.

FIG. 18 is a flow diagram depicting certain steps in a client system scanning process as may be implemented in certain of the embodiments. While scanning the file system under its management the client process may determine that a change has occurred. For example, the client process may have compared a modification or creation timestamp of a file with a list of previously recorded timestamps stored in the local repository. In other embodiments, the client process may have compared the checksums of the file with a previously recorded checksum stored in the local repository. As the comparison of checksums may be computationally intensive, in some embodiments the process may perform a "fast scan" and a "deep scan" of the file system. In a "fast scan" changes are identified based on the file timestamp and/or the file size changes. In a "deep scan", changes may instead be determined based on an checksum comparison, e.g. an MD5 checksum. In some embodiments a deep scan is performed much less frequently than a fast scan, e.g. a default setting may have one deep scan for every ten fast scans (in some embodiments, this value is specified in the setting "md5count" in FIG. 29).

In some embodiments, depending on the type of change, the system may take a plurality of different actions. For example, if at step 1801 the system determines that the change is a modification to an existing file, at step 1802 the system may calculate a checksum of the file and store the checksum in the local repository for future reference.

If versioning is determined to be active at the client process at step 1803, then at step 1804 the client process may record a relation to the previous version of the file. In some embodiments, versioning is always active. In some embodiments the file name will stay the same across multiple versions of the same file. In some embodiments, although each modification to a file may generate an instance requiring replication, metadata associated with the file may be used to indicate that the collection of files are related to one another. Versioning may be specified by a user, or specified by a server process, as part of a replication profile for different file types.

In some embodiments, versioning is always active for files. As the files change, new objects are created in the repository, because each file has a unique ID, for example, an MD5 checksum. In some embodiments, different versions of the same file share a name and location filepath. For example, when a user searches for "file.xls" the user may receive a list of all the objects in the central repository that have that name. This may be a full version history of the specific file. In some embodiments, when a user wants the latest version, they can select that option from the filters, e.g. in the GUI 900.

At step 1807, the client process may update the local repository, e.g. one of local repositories 111, 112, 117, to reflect the new metadata and/or new file checksum.

In some embodiments, e.g. as discussed in relation to FIG. 15, at step 1505, the client process may immediately notify a server process following a detected change and may create and transmit an update packet to the server via steps 1808-10.

If the change is not a modification at step 1801, then at step 1805 the system may determine if the change is a new file. A new file may be detected by analyzing the contents of the file directory recursively and comparing the contents with file data stored in a local repository (e.g., a checksum comparison may be performed). If the change is a new file, at step 1806 the system may calculate the new file's checksum and store the checksum in the local repository for future reference, together with other relevant information (e.g., the file's creation timestamp, the file path, etc.). As discussed above, the system may then update the local repository at step 1807 and update the server at steps 1808-1810.

If the change is not a modification at step 1801, or a new file at step 1805, then at step 1812 the system may determine if the change is a file removal. For example, the change may have been a discrepancy between the file metadata stored in the local repository and a physical file that can be no longer found in a physical storage device.

Though the above steps have been described as occurring in a particular order for ease of explanation, one will recognize that the steps may be grouped or occur differently. For example, steps 1801, 1805, and 1812, may be replaced with a single determination regarding the character of the modification.

Server Process Command Operations

Figure 19:
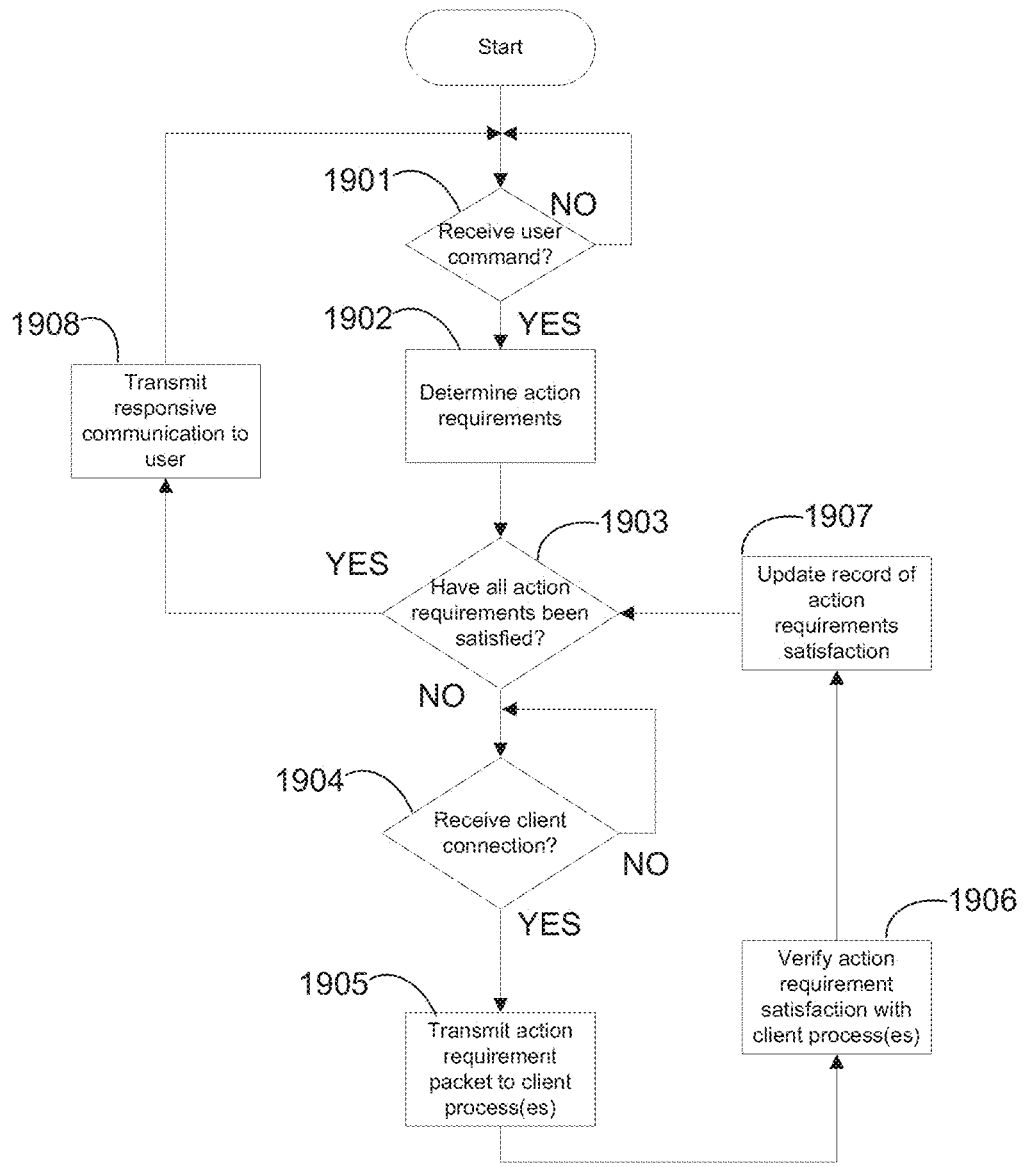
FIG. 19 is a flow diagram depicting certain steps in a server process command operation, in some embodiments a cloud-based server process operation, as may be implemented in certain of the embodiments.

FIG. 19 is a flow diagram depicting certain steps in a server process command operation 1900 as may be implemented in certain of the embodiments. With general reference to the example of FIG. 5, a user 505 may wish to interact with file systems located on private networks 501, 532. At step 1901 the server process 509 may receive a user command from user 505. For example, the server process 509 may receive a command via public network 507 from the user device 504.

At step 1902, the server process 509 may determine the action requirements to be issued to client process 519 and/or client process 520 based on the commands. An "action requirement" as used herein refers generally to a series of actions performed to achieve a certain result, for example, responding to a user command. For example, a command to retrieve a file from the private networks 531, 532 may generate action requirements for client processes 519 and/or 520 to locate the file and to transmit the file to the server process 509.

At step 1903, the server process 509 may determine whether all the action requirements have been satisfied. If the requirements have been satisfied, the server process may transmit a responsive communication to the user at step 1908, e.g. if the user command was a request for an image file, the server process 509 may transmit the file to user device 504 via public network 507.

Where the action requirements have not yet been satisfied, the server process 509 may instead wait for a client connection from specific devices (e.g. devices with client processes having access to needed files). In topologies such as 500, firewalls 513 and 512 may prevent server process 509 from contacting client processes 519, 520 on its own initiative. Instead, server process 509 may wait for a connection from one of client processes 519, 520, e.g. as part of the client process' update packet transmittal in process 1500. Once the connection is established the server process may then begin directing the client process to satisfy the action requirements. In some embodiments, a portion of the client process may include a thread that periodically connects to a cloud server to determine whether there are any action requirements to process. When attempting to satisfy a user request, the server process may wait until either a timeout occurs, or a client process connects that can satisfy the request.

Accordingly, once the server process 509 receives a client connection at step 1904, the server process may then transmit an action requirement packet to the client process(es) using the connection at step 1905.

In some embodiments, following transmittal of the action requirements, the server process 509 may not wait for confirmation from the client process(es) that the action requirements have been fulfilled. In this example, however, the server process 509 may verify that the action requirements were completed at step 1906 and update the record of action requirement satisfaction at step 1907. As the performance of some action requirements may be predicated on the completion of certain other action requirements, the system may repeat steps 1903-1907 several times. For example, to perform a file modification and file copy operation, the server process 509 may first require the client process(es) to complete a modification action requirement. Following completion of the requirement, the server process 509 may then require completion of a copy action requirement.

Client System Action Requirement Reception Process

Figure 20:
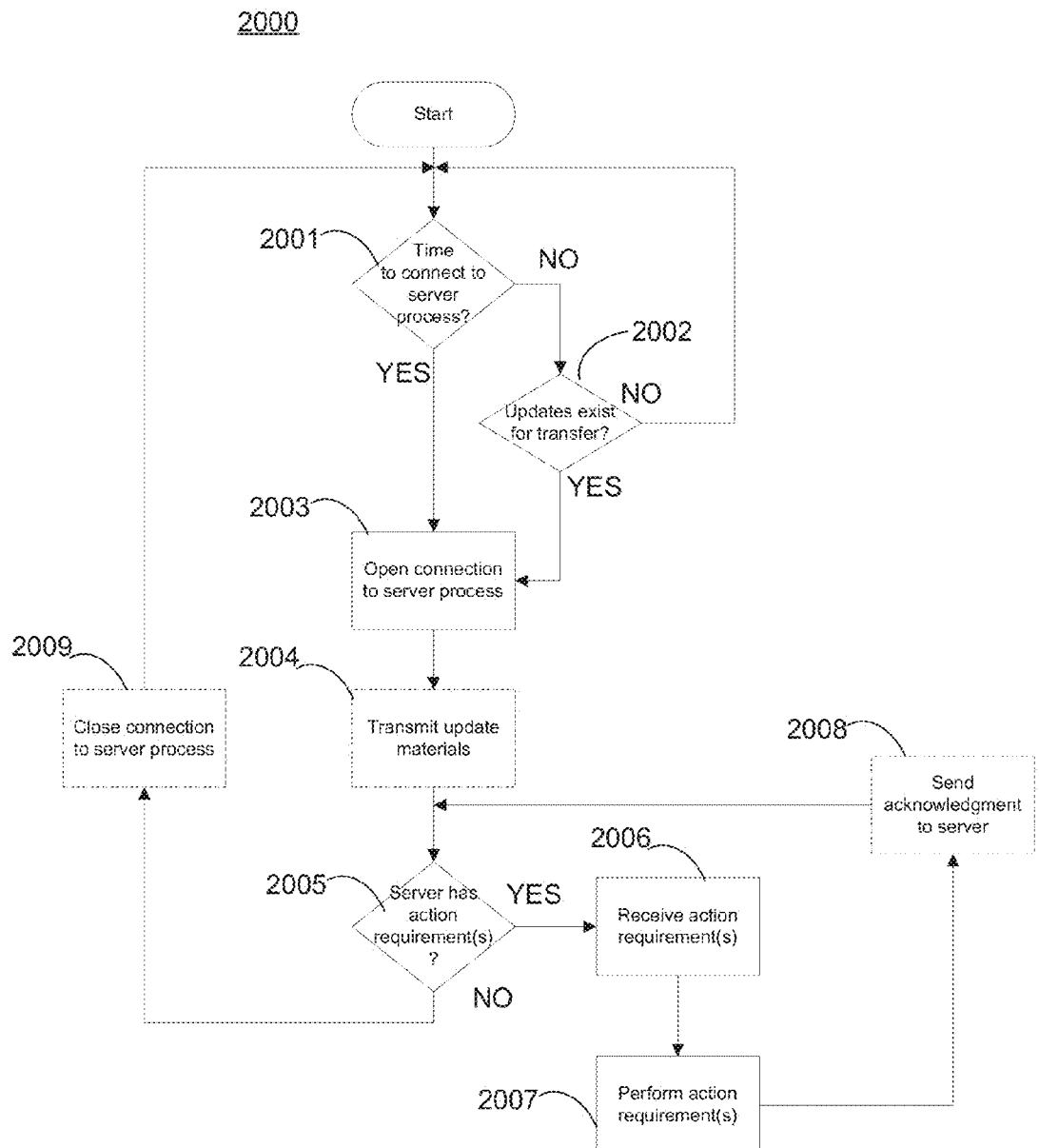
FIG. 20 is a flow diagram depicting certain steps in a client system action requirement reception process as may be implemented in certain of the embodiments.

FIG. 20 is a flow diagram depicting certain steps in a client system action requirement reception process 2000 as may be implemented in certain of the embodiments. At step 2001, the client process, e.g. client process 501 may determine that it is time for an update, e.g., to connect to a server process and determine if there are any action requirements requested by the server. In some embodiments, at step 2001, the client process may instead detect a modification to the file system, e.g. as described in FIG. 15. In some embodiments, the detection may be performed in a separate thread from the threads performing updates and communicating with the server. The updates, in the form of update packets, may be stored in a cache until the communications thread determines their existence. At step 2002, the communications thread may determine if updates exist for transfer.

At step 2003, the client process may open a connection to the server process, e.g., across firewall 513 and via public network 511. At step 2004, the client process may transmit update materials, for example, update packets identified at step 2002.

At step 2005, the client process may determine whether the server process has action requirements. If so, the client process may receive at step 2006 and perform at step 2007 the action requirements. In some embodiments, receipt of an action requirement may serve as notice of the action requirement's existence. In some embodiments, the client process will keep the connection to the server process open if additional action requirements are expected. The client process may provide an acknowledgment to the server at step 2008 once the action requirement is completed. Once all action requirements have been performed, the client process may close the connection to the server at step 2009. As mentioned, in some instances the client process may keep the connection open with the expectation of receiving additional action requirements.

In some embodiments, e.g. certain embodiments implemented in the topology of FIG. 3 where no firewalls are present, it may not be necessary for the server process to await a client process connection. In these embodiments, the server process may initiate a direct request with the client processes, e.g., via an HTTP GET request.

Email Command Server System Polling Process

Figure 21:
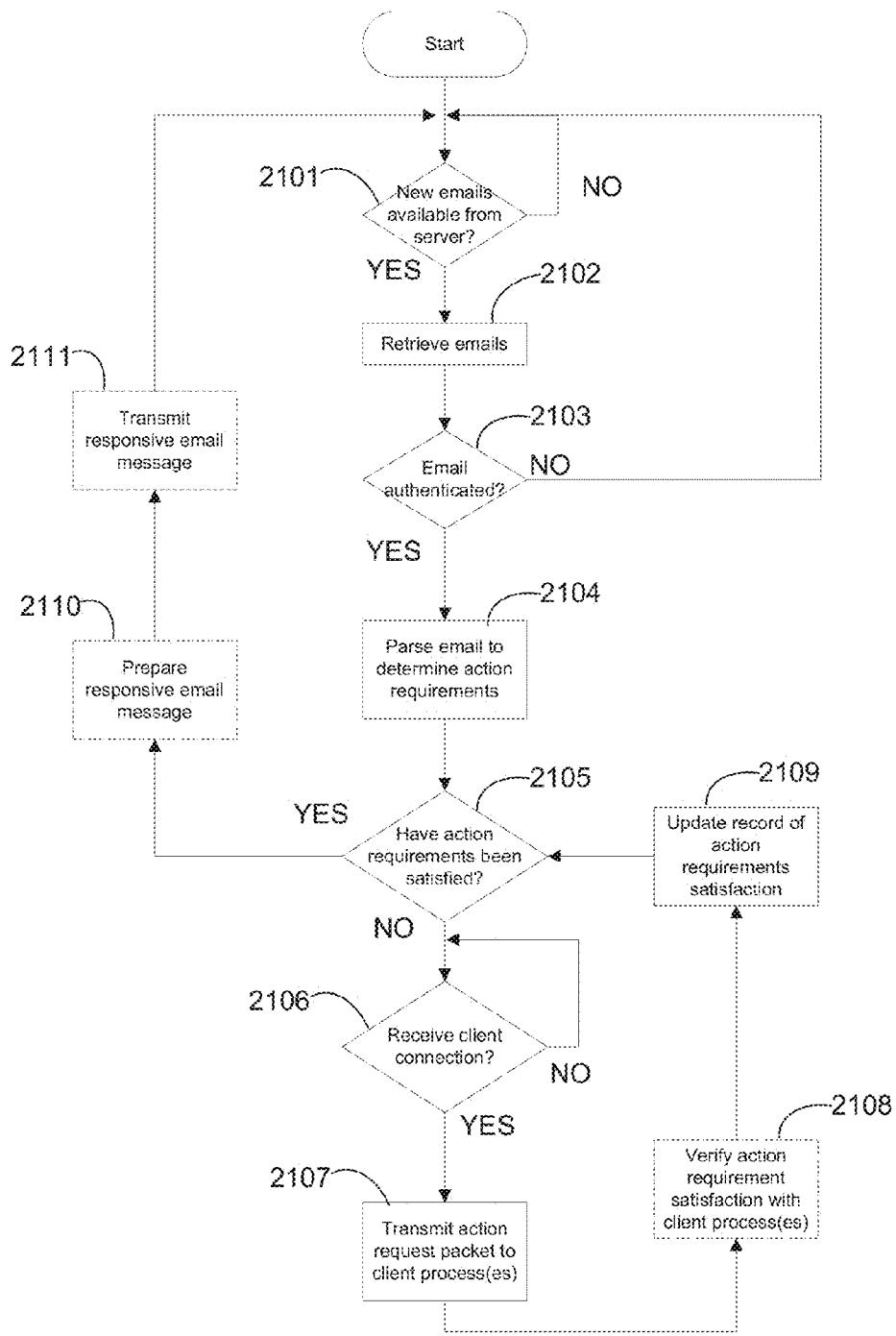
FIG. 21 is a flow diagram depicting certain steps in a server system email command polling process as may be implemented in certain of the embodiments.

FIG. 21 is a flow diagram depicting certain steps in a server system email command polling process as may be implemented in certain of the embodiments. At step 2101, the server process 609 may determine if new emails are available from email server 624. For example, the server process may perform a push or get operation as it would be performed by a common email client (e.g., any server supporting the POP3 protocol). If new emails are available, the server process may retrieve the emails at step 2102.

In some embodiments, the server process may authenticate the email following receipt at step 2103. Authentication may include, for example, verifying that the email sender is registered with the system, verifying that the sender of the email has privileges allowing them to interact with the storage systems specified in the email, verifying that the interactions are permitted to the indicated user, performing a password check to avoid successful spoofing of a user's email account, etc.

Once authenticated, at step 2104 the server process 609 may parse the email to determine appropriate action requirements. In some embodiments, commands may include requesting a list of objects that meet certain criteria, such as all objects that are associated to a specific tag or a time range. Other commands may include requesting a specific file to be included as an attachment in an email response.

Steps 2105-2109 may parallel the behavior of steps 1903-1907 as described above. Rather than transmit a responsive communication directly to a user as at step 1908, the server process may instead prepare a responsive email message 2110 and transmit the message 2111 to the user, e.g. by contacting an email server such as server 624. The responsive email message may be sent to the same account or a different account as the account from which the message was retrieved on server 624. For example, as user with email address user1@user.com may send an email to the address action@filemanagement.com. The response email may be transmitted to the user1@user.com address or to any other address accessible by the user.

Resource Loss and Response

Figure 22:
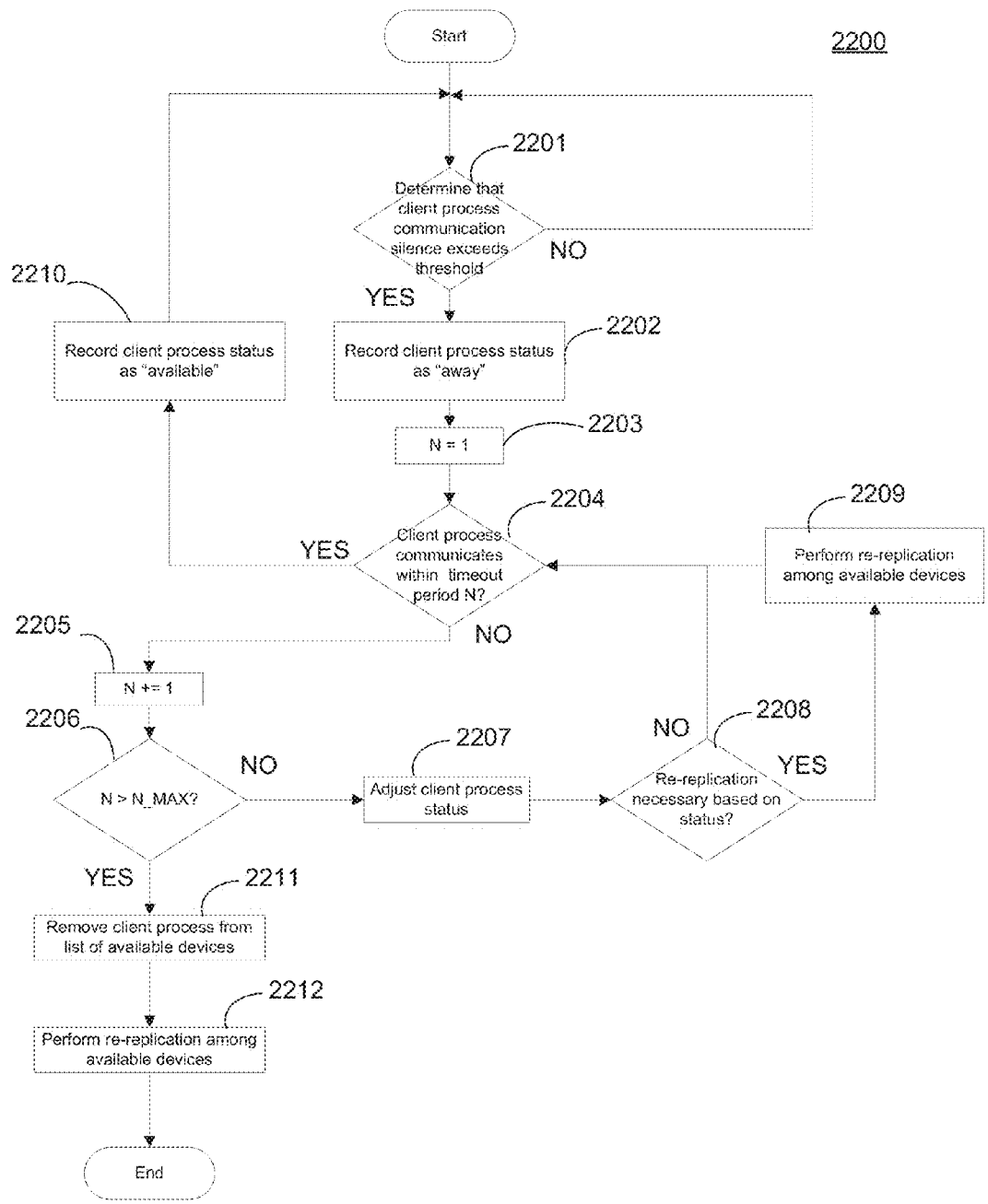
FIG. 22 is a flow diagram depicting certain steps in a resource loss determination and response process, implementing gradations of response, as may be implemented in certain of the embodiments.

FIG. 22 is a flow diagram depicting certain steps in a resource loss determination and response process as may be implemented in certain of the embodiments. The operations 2200 may be run on a server process in some embodiments.

At step 2201, the system may determine that a client process has not communicated with the server for a period exceeding a threshold. For example, a mobile device, such as a smartphone, laptop, or personal digital assistant, may have been removed from the local network with its user's departure. When this occurs, the system may proceed to step 2202, and classify the client process as "away", or otherwise make note of the fact that the client process appears to be unavailable.

At step 2203, the server process may initialize a value, e.g. N, for determining the successive degrees of severity to be associated with the client process' unavailability.

At step 2204, the system may determine if the client process has communicated with the server process within the first of the timeout periods. If the client process has made contact, then at step 2210 the client's status is returned to "available" and operations may continue as they had previously.

Alternatively, if the client process has not made contact, at step 2205 the system may proceed to the next timeout period. As indicated at step 2206, if the timeout period exceeds the maximum number of timeouts, then the system may proceed to step 2211 to take the necessary actions to accommodate the client process' absence.

At step 2211, the system may remove the client process from the list of available devices. Once removed, the server process may not include the client process, or the devices for which it is responsible, in future backup orders. At step 2212, the system may then perform re-replication among the existing available devices now that the client process is removed. For example, if the removed client process was one of three client processes that had stored backup data in three locations for data having a replication factor of three, the system would now identify a new client process to back up the data to again meet the replication requirement. In some embodiments and certain situations, the server process may also dictate that original data from the removed client process that was replicated on other available client process devices, may now be removed (e.g., when the removed client process is no longer considered part of the system's responsibility). For example, with reference to FIG. 4, were computing device 105 to be completely removed from the network 120, the server process 108 may replicate the 20 GB of backup onto the backup 116*c* of external storage 108. When a new device entered the network with a client process, the 20 GB of backup could be moved from the external storage 115's backup on to the new device to recreate a situation similar to the original topology of FIG. 4. In some embodiments, were the device containing an original data, e.g. external storage 115 to become unavailable, server process 108 may remove replications of the original data across the remaining client process systems (in some embodiments the server process 108 may request user verification or may consult a policy profile before doing so).

If at step 2206 the number of timeouts have instead not yet exceeded the maximum value N_MAX, the system may proceed to step 2207. At step 2207 the system may adjust the status of the absent client process. The adjustment may depend in part on the character of the absent client process, e.g., the hardware upon which it is running, the character of the storage under its management, the history of the process' past departures, etc. If the client process were running on a smartphone that a family member took with the them to school on a regular basis, the system may recognize the historical pattern and anticipate the device's future time of return.

At step 2208, the system may determine if re-replication is necessary based upon the client process' status. For example, if it is sufficiently likely that the client process will not return, or if the data managed by the client process is of sufficient importance, etc., the system may begin re-replication at step 2208 in part or in whole.

Though the process 2200 has been described with respect to the absence of a client process, one will recognize that the departure of a storage, e.g. external storage 115, may be handled in a similar manner. A timeout may be used to monitor the length of the time that the external storage has been unavailable to a client process and the server process, or the managing client process, may similarly take corrective action. In some embodiments, the client process may perform a local replication and redistribution among its available storage devices to accommodate the departure.

FIG. 22 depicts the behavior of certain embodiments which implement a "gradual" withdrawal when a device disappears. For example, when N_MAX>0, the missing device is not immediately presumed dead, but given varying degrees of "departure". In some embodiments, however, the missing device may be immediately assumed to be departed. For example, N_MAX may equal 0.

Figure 23:
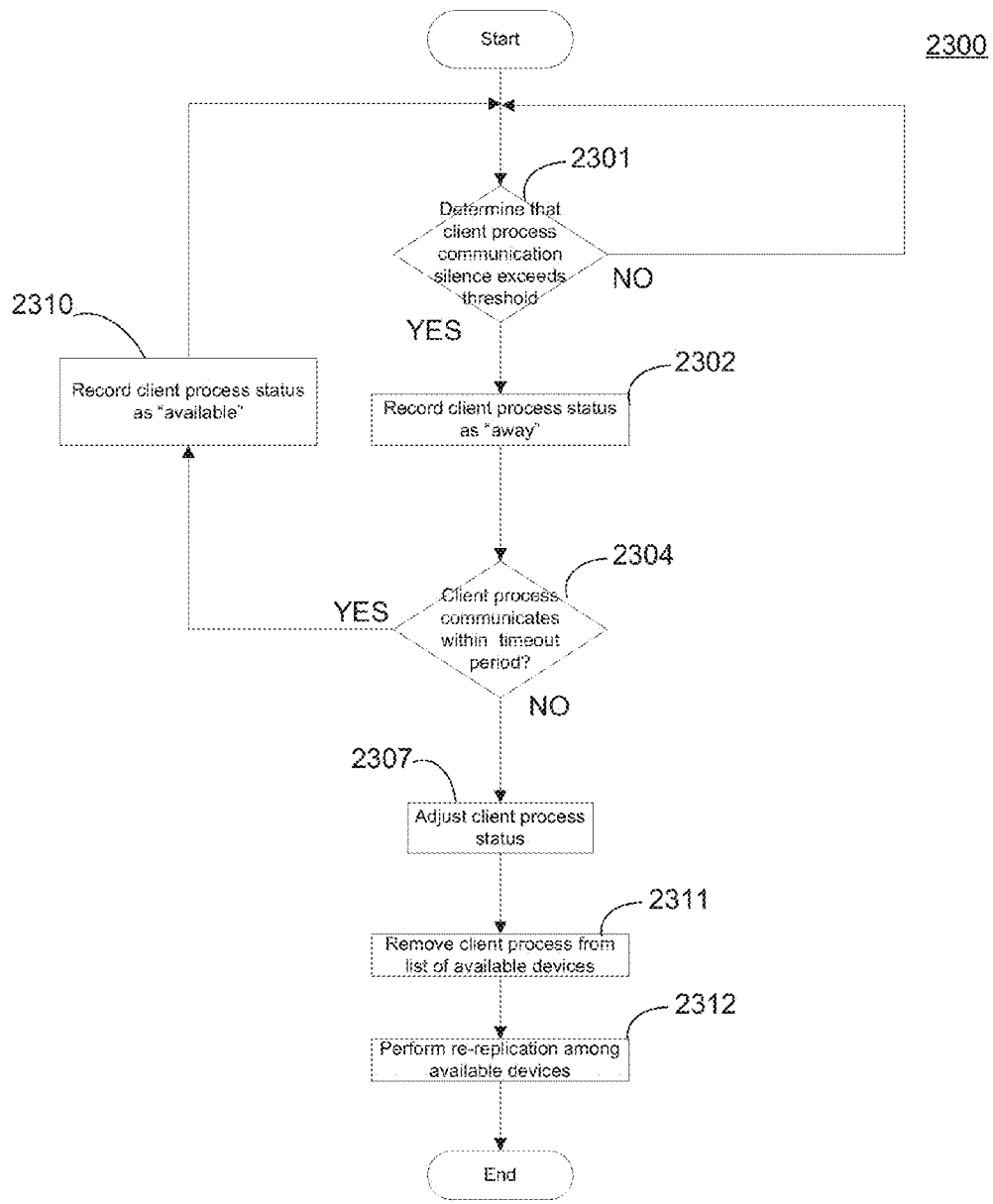
FIG. 23 is a flow diagram depicting certain steps in a resource loss determination and response process as may be implemented in certain of the embodiments.

FIG. 23 is a flow diagram depicting certain steps in a resource loss determination and response process as may be implemented in certain of the embodiments. In FIG. 22 setting N_MAX=0 may have the effect of producing a single level of response to a device's departure. FIG. 23 depicts an example of a single response explicitly. Steps 2301, 2302, 2304, 2310 may parallel steps 2201, 2202, 2204, 2210 in FIG. 22. If the client process has not communicated within the timeout period at step 2304, the process 2300 may proceed directly to step 2307 and adjust the client process status. At step 2311 the server process may remove the client process from the list of available devices. In some embodiments, the client process' status and client process' presence among the list of available devices may be the same, and accordingly steps step 2307 and step 2311 may be merged. At step 2312 the server process may then re-replicate data as needed among the remaining available devices.

In some embodiments, the client processes may ping the server process periodically (e.g., every 30 seconds) by sending an update packet. In some embodiments, if there is no ping from a client process for a fixed period of days, the server process will declare the client process inactive. The number of days threshold may be set on a per-device basis. For example, desktops may be 10 days, laptops may be 30 days.

GUI Update Process

Figure 24:
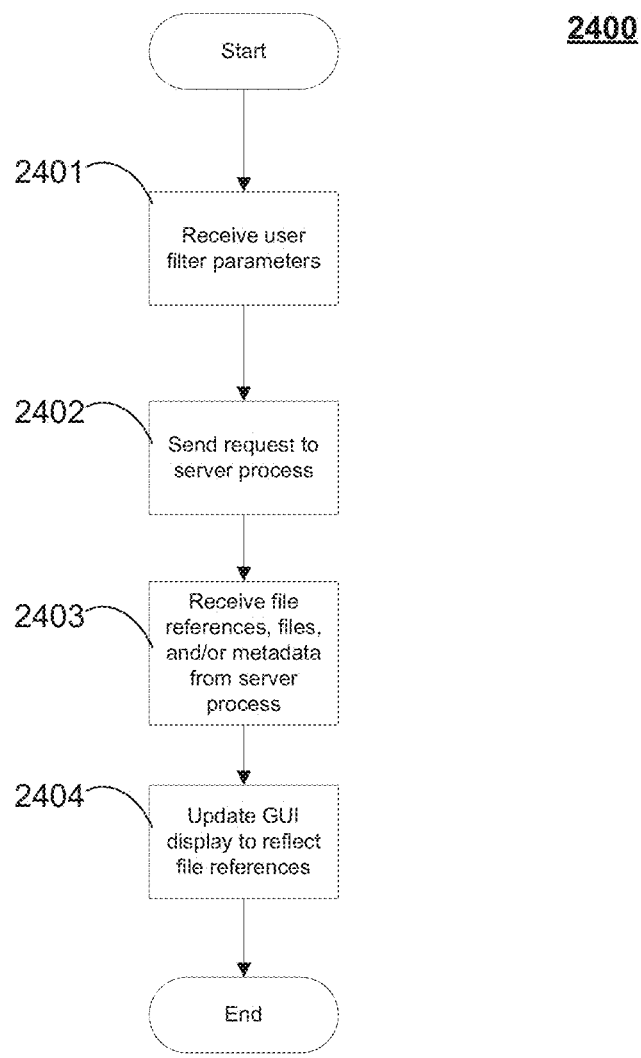
FIG. 24 is a flow diagram depicting certain steps in a client system GUI update and control as may be implemented in certain of the embodiments.

FIG. 24 is a flow diagram depicting certain steps in a client system GUI update and control process 2400 as may be implemented in certain of the embodiments. At step 2401, the system may retrieve user filter parameters, e.g. by polling inputs in filter control region 902.

At step 2402, the system may send a request to a server process to perform the operations. The server process may perform operations, e.g. operations depicted in FIG. 4, to implement action requirements in accordance with the filtering parameters. For example, the server process may perform a file query using each of the client processes, to determine metadata regarding a plurality of files meeting the filter criteria. In some embodiments, the server process may rely on a local cache of file information, e.g., in central repository 107, rather than contact the client processes directly.

At step 2403, the system may receive file references, files, and/or metadata from the server process. Where the user had searched for images of Las Vegas, the server process may return a plurality of file references to image files along with their corresponding metadata, the metadata indicating a correspondence to Las Vegas.

At step 2404, the system may update the GUI 900 to reflect the returned data. For example, the system may populate file display region 909 with a plurality of icons 903a-n corresponding to the returned file references. The metadata may include thumbnails associated with the file references.

Batch Object Structure

Figure 25A:
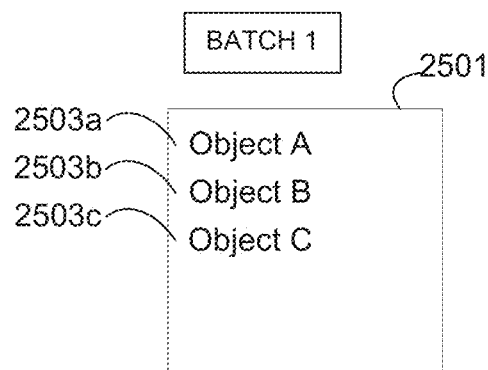
FIG. 25A is a block diagram of an object batch structure as may be implemented in certain of the embodiments.
Figure 25B:
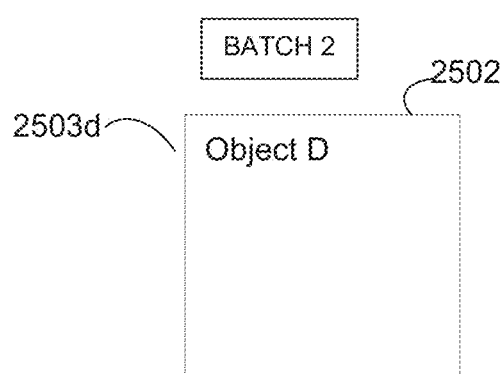
FIG. 25B is a block diagram of an object batch structure as may be implemented in certain of the embodiments.

FIG. 25A is a block diagram of an object batch structure 2501 as may be implemented in certain of the embodiments. The objects 2503a-c may be files identified by a server process via a user's specification as being in need of back up. FIG. 25B is a block diagram of an object batch structure 2502 as may be implemented in certain of the embodiments. In this structure a single file object 2503d is to be backed up.

In some embodiments, a batch may be a collection of objects, e.g. file objects, that have been added into the system. The system, e.g. the server process, may start at batch=0 and the batch number may be increased sequentially as update packets are sent by the client process(es). In the example on FIG. 25A, the system has stored a first batch with 3 objects (Objects A, B, C) from a client, and later received a second batch 2 containing just 1 object (Object D), as depicted in FIG. 25B. In some embodiments, after the batches are added into the system, the batch backup process may begin.

In some embodiments, new objects added to the system are associated with a batch number. The batches 2501, 2502 may be a logical grouping in the system. Each batch may include: a device ID associated with the batch (e.g. the device, or client process, where the batch came from); a total number of files in the batch; a timestamp indicating when processing for the batch ended. The batches may be later scanned sequentially by a backup process to create backup orders based on the batch.

Batch Backup Replication Process

Figure 26:
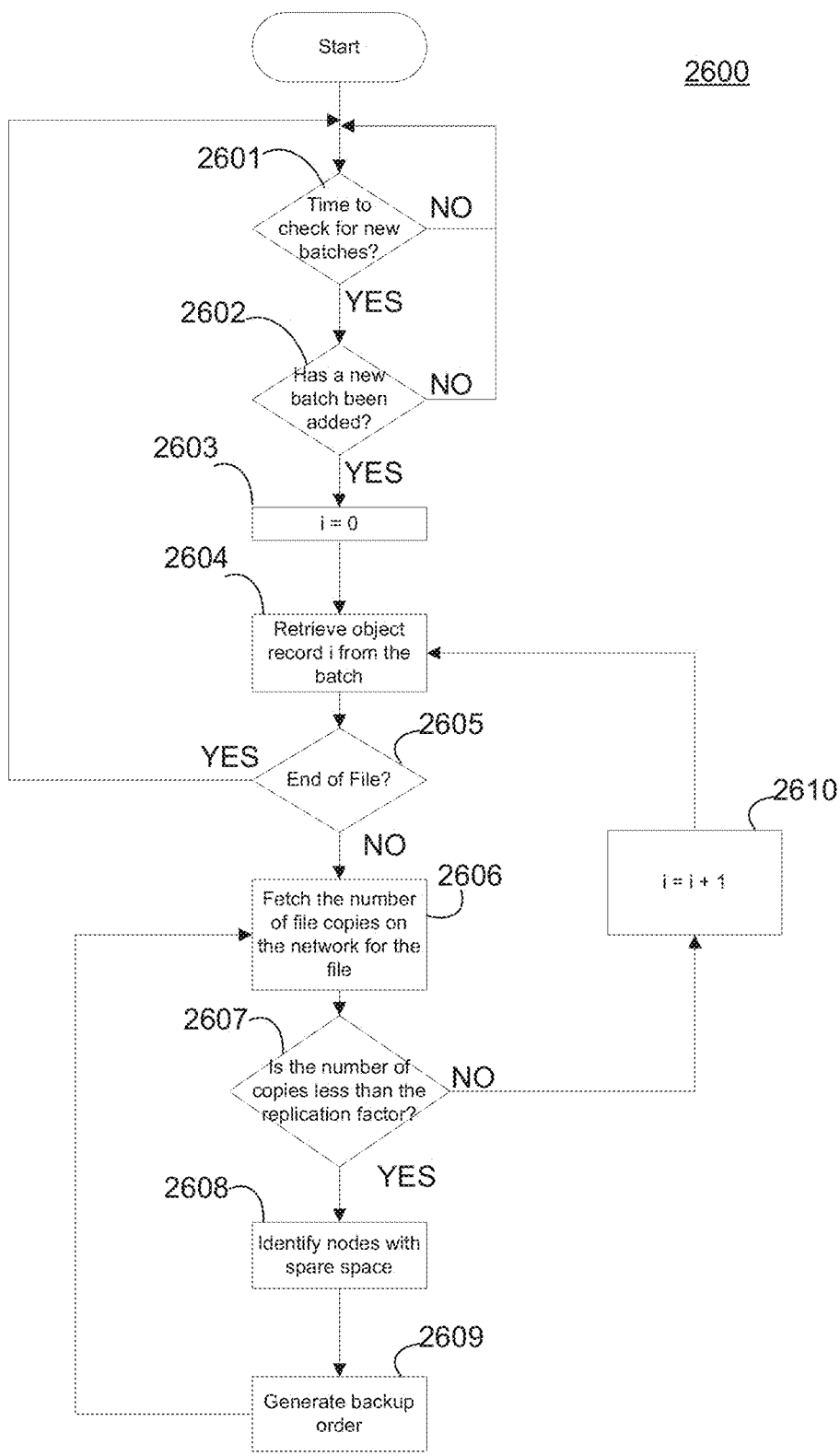
FIG. 26 is a flow diagram depicting certain steps in a backup service operation at a server system as may be implemented in certain of the embodiments.

FIG. 26 is a flow diagram depicting certain steps in a backup service operation 2600 at a server system as may be implemented in certain of the embodiments.

At step 2601, the server process may determine if it is time to check for whether any new batches have arrived at the system.

If it is time to check, then at step 2602, the server process may determine if a new batch has been added.

If a new batch has been added, then at step 2603, the server process may start with the first object in the batch and retrieve the object at step 2604.

At step 2605, the server process may determine if there are any remaining objects in the batch, e.g. if the end of the batch file has been reached.

If object records remain, then at step 2606, the server process may fetch the number of copies that exist for a given file across the network in the central repository.

At step 2607, the server process may determine if the number of copies is less than the current replication factor. If the number of copies across the client process devices is sufficient, the system may iterate to the next record at step 2610.

If the number of copies is not sufficient, the system may identify client processes that are available (e.g., not missing or away) and which have available space at step 2608. At step 2609 the server process may generate a backup order. The backup order may specify the creation of backup copies at the identified available space at step 2608.

Backup Order Object Structure

Figure 27:
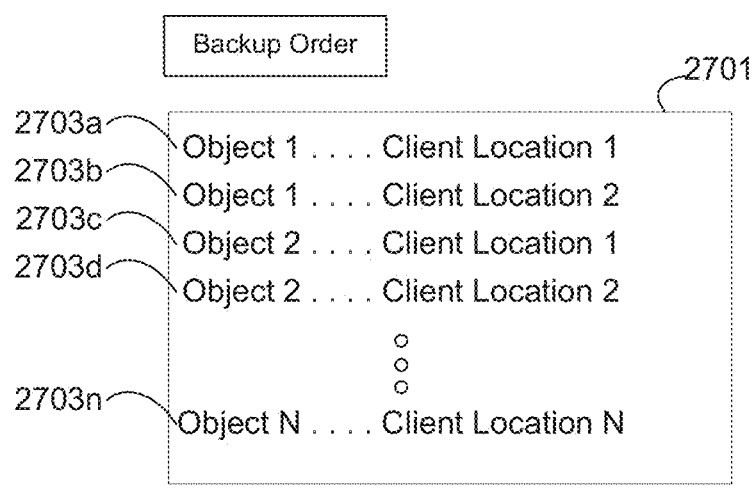
FIG. 27 is a block diagram of a backup order object structure as may be implemented in certain of the embodiments.

FIG. 27 is a block diagram of a backup order object structure as may be implemented in certain of the embodiments. Each of the entries 2703a-n may specify locations for a file to be backed up. For example, two copies of File 1 may be necessary to fulfill a replication factor of three (an original already exists on a device). Accordingly entries 2703a and 2703b indicate locations on devices managed by client processes where the file is to be copied.

In some embodiments, backup orders may be text files generated by a backup server process. The backup orders may be later downloaded by the proper client. On regular intervals, the server backup process may check to see if any new batches have been added to the system. In some embodiments, when a new batch N is added, the backup server process may check, for each file in the batch, to determine if the number of copies of the file is equal to the replication factor for the given file type. If the file is to be replicated in the storage of client process X, then a backup order will be created for client process X, for the batch N.

In this example, a backup order with filename "backup_X_N" may be generated in the server, and may be later fetched to the client. In some embodiments, the file may contain a number of records, where each record has the following file format: <Object_Checksum>, <File Extension>, <Client Location>.

The Object_Checksum may be the unique MD5 checksum of the file. The File Extension may be the file extension of the file (e.g. ".doc", ".xls", etc.). The Client Location may be the full URL pathname that will be used by the Client to retrieve the file from a device that is known to have a copy of the file. The pathname may be encoded in base64. For example, a music file may appear as follows: A565014711FDFF05CCB59970D86489BA,.mp3,http://192.168.1.113:80/L1VzZ XJzL2Fnb3IIbi9sYWNpZS9tcDMvMTEgV2hpc3BIci5tc DMv.mp3.

Backup Order Process

Figure 28:
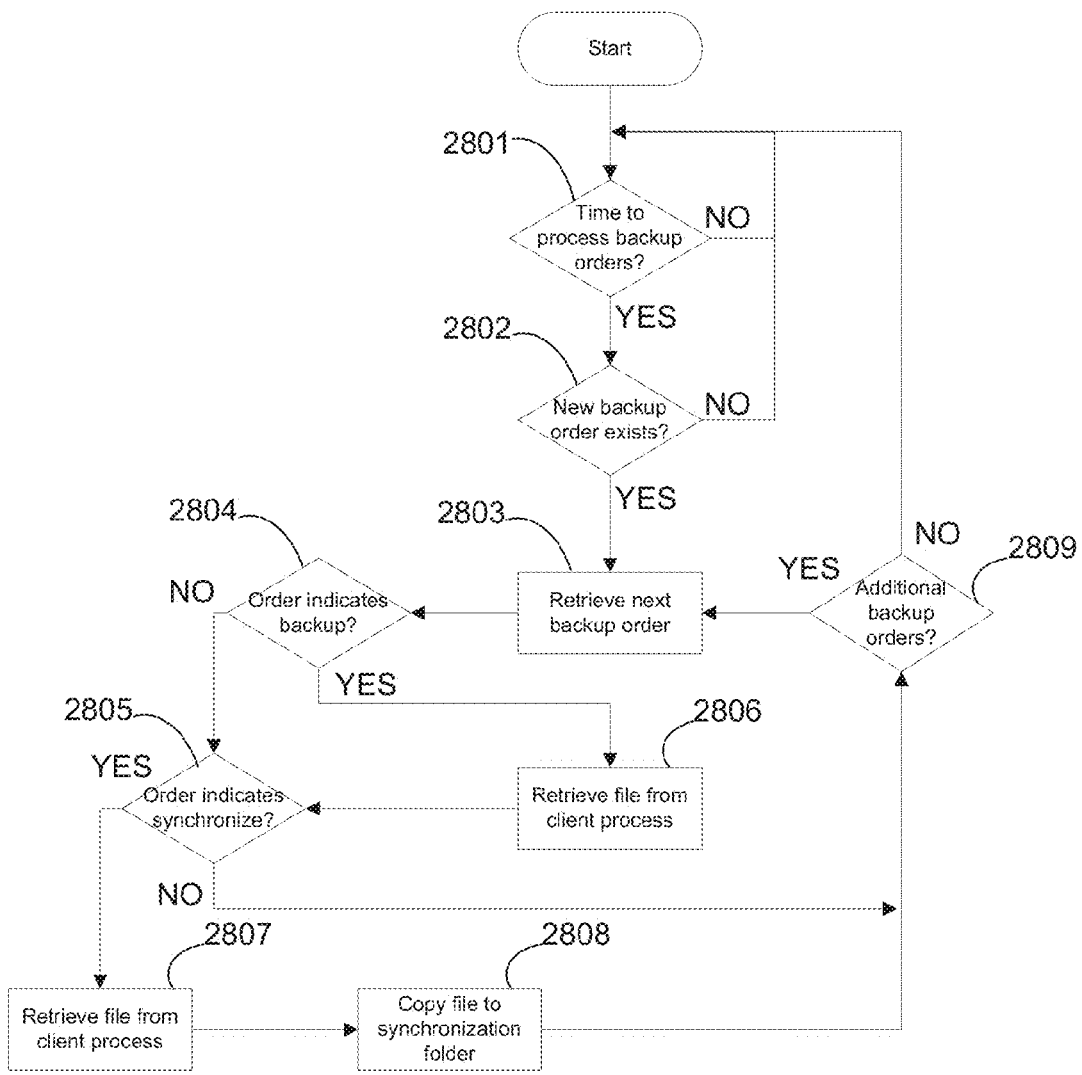
FIG. 28 is a flow diagram depicting certain steps in a backup service operation at a client system as may be implemented in certain of the embodiments.

FIG. 28 is a flow diagram depicting certain steps in a backup service operation at a client process as may be implemented in certain of the embodiments.

At step 2801 the system may determine if it is time to process backup orders.

If it is time to process the orders, at step 2802 the system may determine if the new backup order is available.

At step 2803 the client process may retrieve the next backup order, e.g., by contacting a server process, or by retrieving the orders from the replication order repository 106 directly, in the cases where the server and client are running on the same machine.

At step 2804 the client process may determine if the order indicates that a backup is necessary.

If a backup is necessary, at step 2806 the client process may retrieve a file from a client process.

At step 2805 the client process may determine if the order indicates that a synchronization is necessary.

If a synchronization is necessary, at step 2807 the client process may retrieve a file from another client process. At step 2808 the client process may copy the file to a synchronization folder.

At step 2809 the client process may determine if there are additional backup orders. If so the process may repeat until all the current backup orders have been retrieved.

Settings File

FIG. 29 is a list of settings as may be used in the configuration files of certain embodiments.

Computer System Overview

Figure 30:
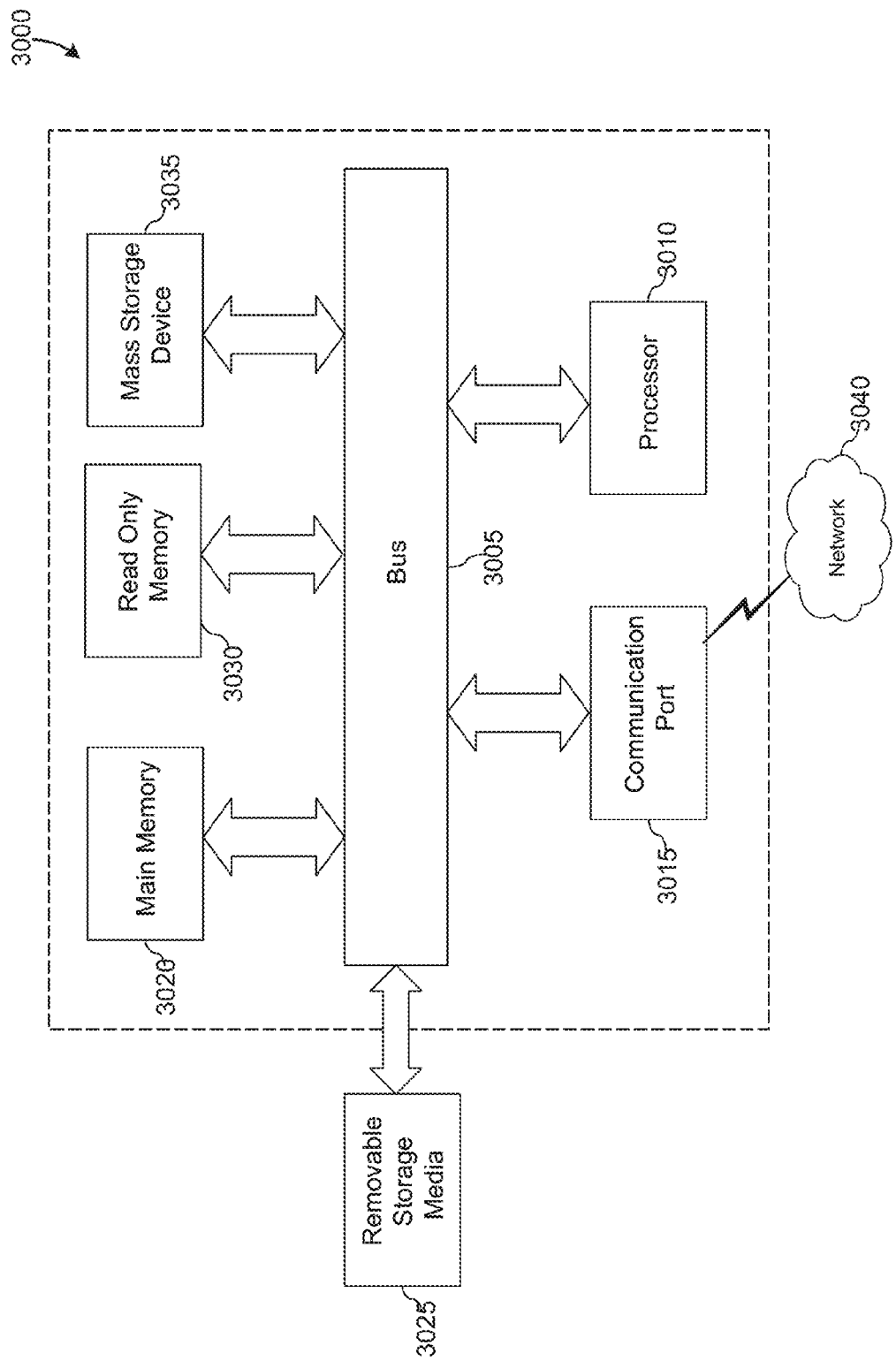
FIG. 30 is a block diagram of a computer system as may be used to implement features of certain of the embodiments.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 30 is an example of a computer system 3000 with which various embodiments may be utilized. Various of the disclosed features may be located on computer system 3000. According to the present example, the computer system includes a bus 3005, at least one processor 3010, at least one communication port 3015, a main memory 3020, a removable storage media 3025, a read only memory 3030, and a mass storage 3035.

Processor(s) 3010 can be any known processor, such as, but not limited to, an Intel® Itanium® or Itanium 2® processor(s), or AMD® Opteron® or Athlon MP® processor(s), or Motorola® lines of processors. Communication port(s) 3015 can be any of an RS-232 port for use with a modem based dialup connection, a 10/100 Ethernet port, or a Gigabit port using copper or fiber. Communication port(s) 3015 may be chosen depending on a network such a Local Area Network (LAN), Wide Area Network (WAN), or any network to which the computer system 3000 connects.

Main memory 3020 can be Random Access Memory (RAM), or any other dynamic storage device(s) commonly known in the art. Read only memory 3030 can be any static storage device(s) such as Programmable Read Only Memory (PROM) chips for storing static information such as instructions for processor 3010.

Mass storage 3035 can be used to store information and instructions. For example, hard disks such as the Adaptec® family of SCSI drives, an optical disc, an array of disks such as RAID, such as the Adaptec family of RAID drives, or any other mass storage devices may be used.

Bus 3005 communicatively couples processor(s) 3010 with the other memory, storage and communication blocks. Bus 3005 can be a PCI/PCI-X or SCSI based system bus depending on the storage devices used.

Removable storage media 3025 can be any kind of external hard-drives, floppy drives, IOMEGA@ Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the disclosed embodiments, as they are only exemplary.

Remarks

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure. For example, although various steps have been discussed in certain of the flow diagrams, one will recognize that additional steps may be performed or depicted steps omitted to accomplish similar functionality. In some instances optional elements may be indicated by dashed outlines in the flow diagrams, whereas in other elements the optionally may be explicitly stated in the text. One will recognize that many process steps not explicitly indicated as being optional may also be optional depending upon the context. The illustrated example flow diagrams are provided for purposes of explanation rather than as limiting depiction of one or more embodiments. Accordingly the depicted steps are illustrative.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limited the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computing device that automatically replicates data across a plurality of managed devices connected to one another across a network as part of a virtual file system and allows a user to review and direct replication of the data managed by the virtual file system via a user interface, the computing device comprising:
   a display;
   a processor communicatively coupled to the display and operable to execute instructions stored in a memory;
   a central repository that hosts records of files located on a plurality of managed devices, wherein the plurality of managed devices includes the computing device and a distinct computing device;
   an order database that includes replication instructions specifying how the files are to be replicated across the plurality of managed devices; and
   the memory, which includes specific instructions for mirroring a virtual file system across the plurality of managed devices, wherein the specific instructions are configured to:
      generate and present a user interface that allows a user to manage the files distributed across the plurality of managed devices;
      install a local client process on the computing device;
      scan the computing device to determine local storage resources;
      identify local files stored in at least a portion of the local storage resources;
      generate a local record for each identified local file;
      store the local records in the central repository;
      identify the distinct computing device to which the computing device is communicatively coupled;
      cause a remote client process to be installed on the distinct computing device, wherein the remote client process is configured to determine whether remote storage resources are available on the distinct computing device and identify remote files stored in at least a portion of the remote storage resources;
      generate a remote record for each remote file identified by the remote client process;
      store the remote records in the central repository;
      receive, from the distinct computing device, a checksum associated with a remote copy of a particular file, wherein transmission of the checksum indicates a modification was made to the remote copy of the particular file on the distinct computing device;
      receive, from the distinct computing device, metadata associated with the remote copy of the particular file;
      update a local copy of the particular file using the checksum, the metadata, or both; and
      update a particular remote record in the central repository corresponding to the remote copy of the particular file using the checksum, the metadata, or both,
      wherein said receiving of the checksum and the metadata requires data be transmitted by the distinct computing device through a firewall.

2. The computing device of claim 1, wherein the local storage resources and the remote storage resources are composed of some combination of available storage, allocated backup storage, and used data storage.

3. The computing device of claim 1, wherein the specific instructions are further configured to:
   determine whether an external storage is communicatively coupled to the computing device; and
   cause the remote client process to determine whether an external storage is connected to the distinct computing device.

4. The computing device of claim 1, wherein the computing device and the distinct computing device are communicatively coupled to one another within a local network.

5. The computing device of claim 1, wherein the specific instructions are further configured to:
    generate an indexed table of the files located on the plurality of managed devices that is composed of the local records and the remote records.

6. The computing device of claim 5, wherein each local record and each remote record includes a unique MD5 checksum and a timestamp of a most recent file modification.

7. The computing device of claim 1, wherein updating the local copy of the particular file and updating the particular remote record stored in the central repository occur in real-time as the checksum and the metadata are received from the distinct computing device.

8. The computing device of claim 1, wherein the central repository includes:
    a storage table that catalogs the local records and the remote records, including the checksums and the metadata; and
    a search table that maps particular metadata terms to one or more checksums.

9. The computing device of claim 1, wherein the specific instructions are further configured to:
    create a local copy of the particular file using the checksum, the metadata, or both;
    store the local copy of the particular file in the local storage resources;
    create a new record for the particular file using the checksum, the metadata, or both; and
    store the new record in the central repository.

10. A computing system configured to manage and host a virtual file system, the computing system comprising:
    a display;
    a processor communicatively coupled to the display and operable to execute instructions stored in a memory;
    a central repository that hosts records of files located on a plurality of managed devices, wherein the plurality of managed devices includes the computing system and a distinct computer system;
    an order database that includes replication instructions specifying how the files are to be replicated across the plurality of managed devices; and
    the memory, which includes specific instructions for mirroring the virtual file system across the plurality of managed devices, wherein the specific instructions are configured to:
        generate and present a graphical user interface (GUI) to a user on the display, wherein the GUI allows the user to interact with the virtual file system;
        install a local client process on the computing system;
        scan the computing system to determine local storage resources;
        identify local files stored in at least a portion of the local storage resources;
        generate a local record for each identified local file;
        store the local records in the central repository;
        identify the distinct computer system to which the computing system is communicatively coupled;
        cause a remote client process to be installed on the distinct computer system, wherein the remote client process is configured to determine whether remote storage resources are available on the distinct computer system and identify remote files stored in at least a portion of the remote storage resources;
        generate a remote record for each remote file identified by the remote client process;
        store the remote records in the central repository;
        receive, from the distinct computer system, a checksum associated with a remote copy of a file stored on the distinct computer system, wherein transmission of the checksum indicates a modification was made to the remote copy of the file on the distinct computer system; and
        receive, from the distinct computer system, metadata associated with the remote copy of the file;
        update a local copy of the file using the checksum, the metadata, or both; and
        update a particular remote record in the central repository corresponding to the remote copy of the file using the checksum, the metadata, or both,
        wherein said reception of the checksum and the metadata requires data be transmitted by the distinct computing system through a firewall.

11. A method for managing a virtual file system distributed across a plurality of devices, the method comprising:
    scanning, by a local client process executed by a host computing system, the host computing system to determine local storage resources;
    identifying, by the local client process, local files stored in at least a portion of the local storage resources;
    generating, by the local client process, a local record for each identified local file;
    storing, by the local client process, the local records in a central repository of the host computing system;
    identifying, by the local client process, another computing system to which the host computing system is communicatively coupled;
    establishing a connection between the host computing system and the other computing system;
    scanning, by a remote client process executed by the other computing system, the other computing system to determine remote storage resources;
    identifying, by the remote client process, remote files stored in at least a portion of the remote storage resources;
    generating, by the local client process, a record for each remote file identified by the remote client process;
    storing, by the local client process, the remote records in the central repository of the host computing system;
    receiving, by the local client process and from the remote client process, a checksum associated with a remote copy of a particular file, wherein transmission of the checksum indicates a modification was made to the remote copy of the particular file on the other computing system;
    receiving, by the local client process and from the remote client process, metadata associated with the remote copy of the particular file;
    updating, by the local client process, a local copy of the particular file using the checksum, the metadata, or both; and
    updating a particular remote record in the central repository corresponding to the remote copy of the particular file using the checksum, the metadata, or both,
    wherein said receiving of the checksum and the metadata requires data be transmitted by the other computing system through a firewall.

12. The method of claim 11, further comprising:
    receiving, via an interface of the host computing system, a user command from a user, wherein the user command represents a request to modify the local copy of the particular file;

modifying the local copy of the particular file according to the user command;

determining a replication factor that represents how many copies of the particular file are to exist within the virtual file system;

determining which of the plurality of devices have available storage space; and transmitting the local copy of the particular file, second metadata associated with the local copy, or both to a subset of the plurality of devices, wherein quantity of the subset is determined based on the replication factor, and wherein the local copy of the particular file, the second metadata, or both are transmitted in real-time as the host computing system receives user commands from the user.

13. The method of claim 12, further comprising:

generating a new local record for the modified local copy of the particular file, the new local record including a unique MD5 checksum and a timestamp of a most recent file modification; and storing the new local record in an index table that catalogs all files stored across the plurality of devices using the virtual file system.

14. The method of claim 13, wherein the index table includes records for files that do not have a copy on the host computing system.

15. The method of claim 12, wherein the replication factor is automatically determined based on file type of the particular file.

16. The method of claim 12, wherein the subset is selected based on computing device uptime, available storage, transfer speed, or some combination thereof.

17. The method of claim 11, wherein the plurality of devices includes one or more cloud-based server systems.

18. The method of claim 11, wherein the plurality of devices includes one or more network-accessible mobile phones, laptops, tablets, desktop computers, servers, or some combination thereof.

* * * * *